United States Patent
Kamiyama et al.

(10) Patent No.: US 10,725,497 B2
(45) Date of Patent: Jul. 28, 2020

(54) CLOCKING DEVICE, ELECTRONIC APPARATUS, AND VEHICLE

(71) Applicant: Seiko Epson Corporation, Tokyo (JP)

(72) Inventors: Masayuki Kamiyama, Chino (JP); Toshiya Usuda, Ina (JP)

(73) Assignee: Seiko Epson Corporation (JP)

( * ) Notice: Subject to any disclaimer, the term of this patent is extended or adjusted under 35 U.S.C. 154(b) by 223 days.

(21) Appl. No.: 16/000,957

(22) Filed: Jun. 6, 2018

(65) Prior Publication Data

US 2018/0356855 A1 Dec. 13, 2018

(30) Foreign Application Priority Data

Jun. 7, 2017 (JP) ................................. 2017-112383
Nov. 28, 2017 (JP) ................................. 2017-228243

(51) Int. Cl.
| | | |
|---|---|---|
| G06F 1/00 | (2006.01) | |
| G06F 1/14 | (2006.01) | |
| G04C 9/04 | (2006.01) | |
| G06F 15/177 | (2006.01) | |
| G04C 11/00 | (2006.01) | |
| G04C 9/00 | (2006.01) | |
| G04G 5/00 | (2013.01) | |
| G04G 7/00 | (2006.01) | |

(52) U.S. Cl.
CPC ................. *G06F 1/14* (2013.01); *G04C 9/00* (2013.01); *G04C 9/04* (2013.01); *G04C 11/00* (2013.01); *G04G 5/00* (2013.01); *G04G 7/00* (2013.01); *G06F 15/177* (2013.01)

(58) Field of Classification Search
CPC ........... G06F 1/14; G06F 15/177; G04C 9/00; G04C 9/04; G04C 11/00; G04G 5/00; G04G 7/00
See application file for complete search history.

(56) References Cited

U.S. PATENT DOCUMENTS

| | | | | |
|---|---|---|---|---|
| 5,276,659 A * | 1/1994 | Kotaki | ...................... | G06F 1/14 368/10 |
| 5,481,507 A * | 1/1996 | Suzuki | ...................... | G04G 3/02 368/200 |
| 5,886,583 A * | 3/1999 | Horiuchi | ................. | H03L 7/093 331/11 |
| 6,178,206 B1 * | 1/2001 | Kelly | .................... | H04L 7/0008 375/219 |

(Continued)

FOREIGN PATENT DOCUMENTS

| | | |
|---|---|---|
| JP | 04-096115 A | 3/1992 |
| JP | 2015-203667 A | 11/2015 |

*Primary Examiner* — Aurel Prifti
(74) *Attorney, Agent, or Firm* — Harness, Dickey & Pierce, P.L.C.

(57) ABSTRACT

A clocking device includes a first clocking circuit that generates first clocking data in synchronization with a clock signal, a second clocking circuit that generates second clocking data which is updated in a cycle longer than a cycle in which the first clocking data is updated, an interface circuit that transmits the first clocking data to an external device, and receives a first correction value from the external device, and a storage circuit that stores the first correction value, in which the first clocking circuit sets the first correction value in the first clocking data so as to correct an update timing of the second clocking data.

7 Claims, 15 Drawing Sheets

(56) References Cited

U.S. PATENT DOCUMENTS

| | | | | |
|---|---|---|---|---|
| 6,185,691 | B1* | 2/2001 | Gandhi | G06F 1/06 |
| | | | | 713/500 |
| 6,625,209 | B1* | 9/2003 | Najafi | G04G 5/002 |
| | | | | 375/222 |
| 2008/0211969 | A1* | 9/2008 | Simon | H04H 20/18 |
| | | | | 348/725 |
| 2010/0091614 | A1* | 4/2010 | Fujisawa | G01S 19/24 |
| | | | | 368/14 |
| 2010/0228948 | A1* | 9/2010 | Jaekwan | G04R 20/06 |
| | | | | 711/221 |
| 2011/0249718 | A1* | 10/2011 | Zerbe | H03L 7/07 |
| | | | | 375/226 |
| 2012/0110364 | A1* | 5/2012 | Bhargava | G06F 1/12 |
| | | | | 713/400 |
| 2013/0016589 | A1* | 1/2013 | Takada | G04R 20/10 |
| | | | | 368/47 |
| 2013/0142300 | A1* | 6/2013 | Takemura | G04F 1/005 |
| | | | | 377/20 |
| 2015/0185705 | A1* | 7/2015 | Oshita | G04R 20/04 |
| | | | | 368/28 |
| 2017/0153661 | A1* | 6/2017 | Kamiyama | G06F 1/12 |
| 2017/0168520 | A1* | 6/2017 | Yu | G06F 1/12 |
| 2017/0307762 | A1* | 10/2017 | Nakajima | G01S 19/235 |
| 2018/0124451 | A1* | 5/2018 | Takahashi | H04N 21/434 |
| 2018/0231663 | A1* | 8/2018 | Matsue | G01S 19/24 |
| 2020/0052875 | A1* | 2/2020 | Scarpa | H04L 7/0331 |

* cited by examiner

CLOCKING DEVICE, ELECTRONIC APPARATUS, AND VEHICLE

BACKGROUND

1. Technical Field

The present invention relates to a clocking device, an electronic apparatus, and a vehicle.

2. Related Art

JP-A-2015-203667 discloses a time synchronization apparatus which synchronizes a slave with a master in terms of time. JP-A-4-96115 discloses a system which corrects a slave clock time of a slave on the basis of a master clock time of a master.

In both of the apparatus disclosed in JP-A-2015-203667 and the system disclosed in JP-A-4-96115, since time information of a slave is synchronized with time information of a master, in a case where the supply of power to the master is stopped, and thus the time information is lost, there is a problem in that time information of the slave cannot be synchronized with time information of the master until the supply of power is resumed, and then the master acquires time information. In order to solve this problem, there may be the use of a clocking device (real-time clocking device) which can perform clocking with a backup power source in synchronization with time information of a master even if the supply of power to the master is stopped. In a general system using such a clocking device, in many cases, a master sets time of a slave in the unit of one second, and reflection of the set time or a count starting timing in the clocking device is based on a transmission timing of a command from the master.

Meanwhile, in a system in which a minute error is problematic, in order to ensure clocking accuracy of a clocking device, a master may periodically repeatedly set time in the clocking device. Consequently, the time of the clocking device is periodically corrected. However, for example, in such a system, a count initial value of a frequency division circuit of below 1 Hz cannot be set to an absolute value, and thus, unless timing adjustment is performed through complex communication control, there is a probability that a time setting difference of one second to the maximum may occur. Even when time is read from a clocking device, there is a probability that a time difference may occur due to a communication time or the like. As a result of the occurrence of a time difference, there is a problem in that clocking in a clocking device cannot be accurately corrected.

SUMMARY

An advantage of some aspects of the invention is to provide a clocking device which can correct clocking more simply than in the related art. Another advantage of some aspects of the invention is to provide an electronic apparatus and a vehicle using the clocking device.

The invention can be implemented as the following forms or application examples.

Application Example 1

A clocking device according to this application example includes a first clocking circuit that generates first clocking data in synchronization with a clock signal; a second clocking circuit that generates second clocking data which is updated in a cycle longer than a cycle in which the first clocking data is updated; an interface circuit that transmits the first clocking data to an external device, and receives a first correction value from the external device; and a storage circuit that stores the first correction value, in which the first clocking circuit sets the first correction value in the first clocking data so as to correct an update timing of the second clocking data.

The clocking device according to the application example may further include an oscillation circuit that outputs the clock signal. The second clocking circuit may generate the second clocking data which is updated in a cycle longer than a cycle in which the first clocking data is updated on the basis of the clock signal. Here, "generating the second clocking data which is updated in a cycle longer than a cycle in which the first clocking data is updated on the basis of the clock signal" includes not only a case where the second clocking data is updated at a rising timing or a falling timing of each pulse of the clock signal, but also a case where the second clocking data is updated on the basis of a signal (for example, a carry signal from the first clocking circuit) generated at a rising timing or a falling timing of at least some pulses of the clock signal.

According to this application example, the external device may recognize a clocking difference on the basis of the first clocking data transmitted from the clocking device via the interface circuit, and may transmit the first correction value for removing the difference to the clocking device. The clocking device receives the first correction value via the interface circuit, stores the first correction value in the storage circuit, and sets the first correction value stored in the storage circuit in the first clocking data so as to correct the update timing of the second clocking data. In other words, according to the clocking device related to the application example, a difference in clocking including communication delay is corrected by using the first correction value, and thus it is possible to perform clocking correction more simply than in the related art.

Application Example 2

In the clocking device according to the application example, in a case where the first clocking data is a predetermined value, the first clocking circuit may set the first correction value in the first clocking data so as to correct the update timing.

According to the clocking device according to this application example, since the first correction value is set in the first clocking data at a fixed timing, the external device can transmit the first correction value for correcting the update timing of the second clocking data with high accuracy.

Application Example 3

In the clocking device according to the application example, the first correction value may be a value which is generated by the external device on the basis of the first clocking data and clocking data included in the external device.

According to this application example, the external device can recognize a clocking difference on the basis of the first clocking data transmitted from the clocking device via the interface circuit and clocking data used as a reference, and can transmit the accurate first correction value for removing the difference to the clocking device. Therefore, according to the clocking device related to the application example, a difference in clocking including communication delay can be accurately corrected by using the first correction value.

Application Example 4

In the clocking device according to the application example, the first clocking circuit may update the first clocking data in the unit of 1/1000 seconds, and the second clocking circuit may update the second clocking data in the unit of one second.

According to the clocking device according to this application example, a difference in clocking including communication delay can be accurately corrected in the unit of 1/1000 seconds.

Application Example 5

In the clocking device according to the application example, a frequency of the clock signal may be 4096 Hz, and the first clocking circuit may have a counter which selects 40 and 41 at a ratio of 4 to 96 and counts the number of pulses of the clock signal in 6 bits, and may output a higher 4-bit count value of a 6-bit count value output from the counter as part of the first clocking data.

According to the clocking device according to this application example, the first clocking circuit can output the clocking data indicating decimal numbers "0" to "9" as a time in the unit of 1/1000 seconds without increasing current consumption much with a simple circuit configuration on the basis of higher 4-bit count values "0000" to "1001" of 6-bit count values "000000" to "100111" counted by the counter.

Application Example 6

In the clocking device according to the application example, the storage circuit may further store a second correction value and a correction cycle, and the first clocking circuit may set the second correction value in the first clocking data so as to correct the update timing in the correction cycle.

According to the clocking device according to this application example, the second correction value stored in the storage circuit is set in the first clocking data in the correction cycle stored in the storage circuit, and thus the update timing of the second clocking data is corrected. Therefore, according to the clocking device related to the application example, even in a situation in which correction of the update timing of the second clocking data using the first correction value is not performed for a long period of time, a clocking difference generated due to secular change or the like can be corrected.

Application Example 7

An electronic apparatus according to this application example includes any one of the clocking devices described above; and a control device that transmits the first correction value to the clocking device as the external device.

According to the electronic apparatus according to this application example, a difference in clocking in the clocking device, including communication delay is corrected by using the first correction value transmitted from the control device, and thus it is possible to perform clocking correction in the clocking device more simply than in the related art. Therefore, for example, it is possible to implement an electronic apparatus with higher reliability than in the related art at lower cost.

Application Example 8

A vehicle according to this application example includes any one of the clocking devices described above.

According to the vehicle according to the application example, it is possible to perform clocking correction in the clocking device more simply than in the related art. Therefore, for example, it is possible to implement a vehicle with higher reliability than in the related art at lower cost.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail. The present embodiment described below is not intended to improperly limit the content of the invention disclosed in the appended claims. All constituent elements described below are not essential as solving means of the invention.

1. Clocking Device (Real-Time Clocking Device)

1-1. First Embodiment

Configuration and Operation of Clocking Device

Figure 1:
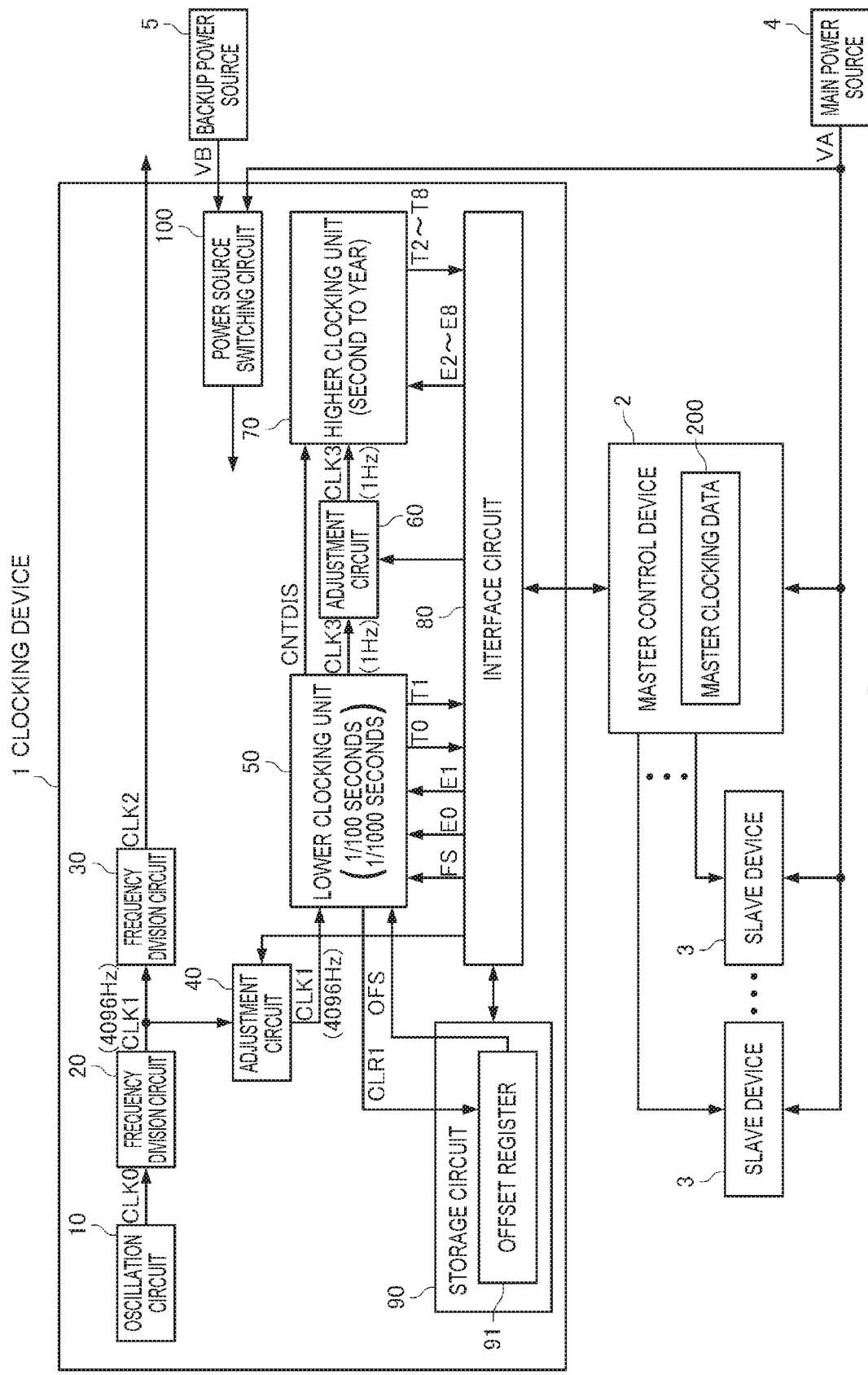
FIG. 1 is a diagram illustrating a functional block of a clocking device and a configuration example of a processing system according to a first embodiment.

FIG. 1 is a diagram illustrating a functional block of a clocking device (real-time clocking device) 1 and a configuration example of a processing system using the clocking device 1 according to a first embodiment. As illustrated in FIG. 1, the processing system is configured to include the clocking device 1, a master control device 2, a plurality of slave devices 3, a main power source 4, and a backup power source 5.

The master control device 2 has master clocking data 200 which is considerably accurate time information and is used as a reference, and distributes the master clocking data 200 to the respective slave devices 3 in response to a request from each of the slave devices 3 or periodically. Each slave device 3 performs various processes by adjusting internal time thereof to the master clocking data 200. The master clocking data 200 is, for example, time information acquired from a global positioning system (GPS) or a network by the master control device 2, and a clocking error thereof is, for example, $10^{-6}$ seconds or less. The master clocking data 200 is updated at a necessary timing or periodically.

The master control device 2 and each slave device 3 perform operations by being supplied with power from the main power source 4, and stop the operations in a case where the supply of power from the main power source 4 is interrupted. In contrast, the clocking device 1 is supplied with power from the main power source 4 and performs clocking operation during normal operation, but immediately switches to a clocking operation using power supplied from the backup power source 5 if the supply of power from the main power source 4 is interrupted. In other words, the clocking device 1 continuously performs the clocking operation even while the supply of power from the main power source 4 is interrupted.

In a case where the supply of power from the main power source 4 is resumed, the master control device 2 tries to update the master clocking data 200, but a long period of time (for example, several minutes to several tens of minutes) may be required for update. Therefore, in a case where the supply of power from the main power source 4 is resumed, the master control device 2 reads clocking data from the clocking device 1, and uses the clocking data as the master clocking data 200. In the present embodiment, the master control device 2 reads clocking data including information such as year, month, day, hour, minute, second, and millisecond from the clocking device 1, and uses the clocking data read from the clocking device 1 as the master clocking data 200 until accurate clocking data can be acquired from a GPS or a network. In this case, for example, the clocking data from the clocking device 1 is required to have the extent of accuracy to which an error is within about 13 seconds per month (about ±5 ppm when converted into deviation from the reference frequency).

As illustrated in FIG. 1, the clocking device 1 is configured to include an oscillation circuit 10, a frequency division circuit 20, a frequency division circuit 30, an adjustment circuit 40, a lower clocking unit 50, an adjustment circuit 60, a higher clocking unit 70, an interface circuit 80, a storage circuit (storage unit) 90, and a power source switching circuit 100. However, the clocking device 1 may have a configuration in which some of the constituent elements are omitted or changed, or other constituent elements are added thereto. The clocking device 1 performs a clocking operation in synchronization with a clock signal, and thus has a function of a real time clock (RTC) generating clocking data.

The oscillation circuit 10 generates a clock signal CLK0 having the frequency of a power of 2, for example, the frequency of 32768 Hz ($=2^{15}$ Hz) by performing an oscillation operation.

Figure 2:
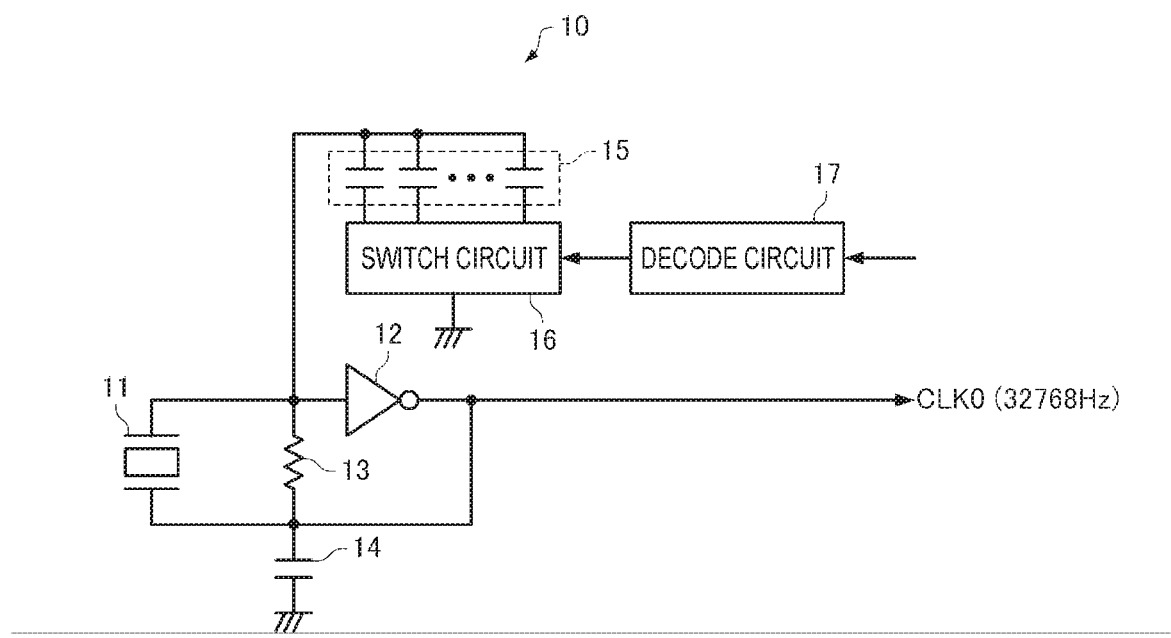
FIG. 2 is a diagram illustrating a configuration example of an oscillation circuit.

FIG. 2 is a diagram illustrating a configuration example of the oscillation circuit 10. As illustrated in FIG. 2, the oscillation circuit 10 is configured to include a resonator 11, an inverter (logical inverting element) 12, a resistor 13, a capacitor 14, a capacitor group 15, a switch circuit 16, and a decode circuit 17.

The inverter 12 has an input terminal connected to one end of the resonator 11 and an output terminal connected to the other end of the resonator 11. The resistor 13 has one end connected to the input terminal of the inverter 12 and the other end connected to the output terminal of the inverter 12. The capacitor 14 has one end connected to the other end of the resistor 13 and the other end connected to the ground.

The capacitor group 15 is formed of a plurality of capacitors, and one end of each of the plurality of capacitors is connected to the input terminal of the inverter 12, and the other end thereof is connected to the ground or is open (high impedance state) via the switch circuit 16. The switch circuit 16 causes the other end of each capacitor included in the capacitor group 15 to be connected to the ground or to be open (high impedance state) in response to a control signal output from the decode circuit 17. The decode circuit 17 decodes, for example, data (capacity selection data) stored in the storage circuit 90 (refer to FIG. 1) so as to output a control signal for the switch circuit 16.

In the oscillation circuit 10 configured in the above-described way, the inverter 12 inversely amplifies an output signal from the resonator 11, and feeds back the inversely amplified signal to the resonator 11. Consequently, the resonator 11 oscillates at an inherent resonance frequency or a frequency close thereto, and an output signal (a signal obtained by inverting and amplifying an output signal from the resonator 11) from the inverter 12 is output from the oscillation circuit 10 as the clock signal CLK0. Since fine adjustment of an oscillation frequency of the oscillation circuit 10 can be performed by changing a combined capacitance value of the capacitor group 15, for example, capacitance selection data enabling a desired oscillation frequency to be obtained is determined in an inspection process for the clocking device 1, and is written to a nonvolatile memory (not illustrated) of the storage circuit 90.

For example, the oscillation circuit 10 may be a quartz crystal oscillation circuit using a tuning fork type quartz crystal resonator, an AT cut quartz crystal resonator, or an SC cut quartz crystal resonator as the resonator 11, and may be an oscillation circuit using a surface acoustic wave (SAW) resonator or a piezoelectric resonator other than a quartz crystal resonator as the resonator 11. The oscillation circuit 10 may be an oscillation circuit using a micro electromechanical systems (MEMS) resonator made of silicon semiconductor as the resonator 11. The resonator 11 may be excited due to a piezoelectric effect, and may be driven by Coulomb force (electrostatic force).

Referring to FIG. 1 again, the clock signal CLK0 output from the oscillation circuit 10 is supplied to the frequency division circuit 20. However, in the clocking device 1, the oscillation circuit 10 may be omitted, and the clock signal CLK0 may be supplied to the frequency division circuit 20 from the outside. The frequency division circuit 20 frequency-divides the clock signal CLK0, so as to generate a clock signal CLK1 having the frequency of 4096 Hz (=$2^{12}$ Hz).

Figure 3:
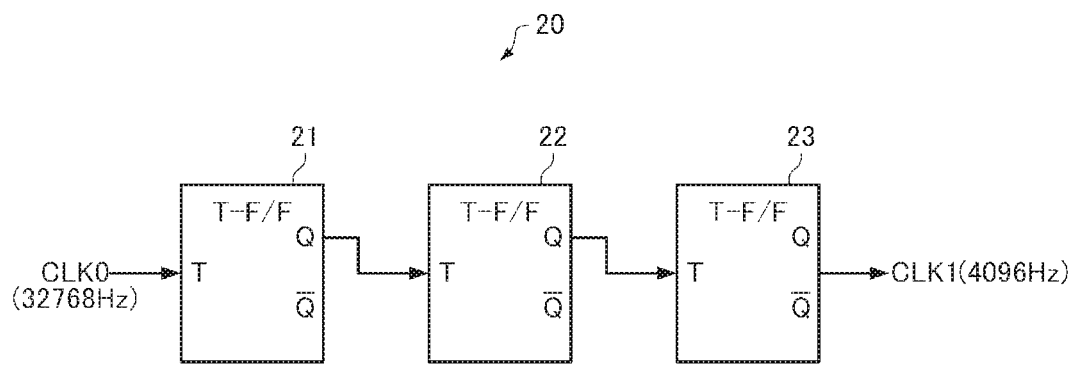
FIG. 3 is a circuit diagram illustrating a configuration example of a frequency division circuit.

FIG. 3 is a circuit diagram illustrating a configuration example of the frequency division circuit 20. As illustrated in FIG. 3, the frequency division circuit 20 is formed by connecting, for example, a toggle (T) type flip-flops 21 to 23 in series to each other. Each of the T type flip-flops 21 to 23 inverts an output signal whenever a signal which is input to an input terminal T changes by one cycle, so as to frequency-divide the signal input to the input terminal T by 2. Consequently, the frequency division circuit 20 frequency-divides the clock signal CLK0 having, for example, 32768 Hz (=$2^{15}$ Hz) by 8 (=$2^{3}$), so as to generate the clock signal CLK1 having the frequency of 4096 Hz (=$2^{12}$ Hz). FIG. 3 illustrates a configuration example of the frequency division circuit 20 in a case where the clock signal CLK0 has the frequency of 32768 Hz (=$2^{15}$ Hz), but, in a case where the clock signal CLK0 has the frequency of $2^N$ Hz (where N is an integer of 13 or greater), (N−12) T type flip-flops may be connected in series to each other.

Referring to FIG. 1 again, the clock signal CLK1 is supplied to the frequency division circuit 30, and is supplied to the lower clocking unit 50 via the adjustment circuit 40. The frequency division circuit 30 frequency-divides the clock signal CLK1 so as to generate a clock signal CLK2 having any frequency. The frequency division circuit 30 may be formed of T type flip-flops of the number corresponding to a frequency division ratio in the same manner as the frequency division circuit 20 (FIG. 3). The clock signal CLK2 may be supplied to various internal circuits of the clocking device 1, and may be output to the outside of the clocking device 1 so as to be supplied to various devices.

The lower clocking unit 50 (an example of a "first clocking circuit") performs a clocking operation in synchronization with the clock signal CLK1, so as to generate pieces of clocking data T1 and T0 (an example of "first clocking data"). The clocking data T1 is clocking data indicating a time in the unit of 1/100 seconds, and the clocking data T0 is clocking data indicating a time in the unit of 1/1000 seconds. In other words, the lower clocking unit 50 updates the pieces of clocking data T1 and T0 in the unit of 1/1000 seconds. The lower clocking unit 50 generates a clock signal CLK3 having the frequency of 1 Hz on the basis of the clock signal CLK1. The clock signal CLK3 is supplied to the higher clocking unit 70 via the adjustment circuit 40. The lower clocking unit 50 generates a count disable signal CNTDIS for stopping a clocking operation of the higher clocking unit 70.

The higher clocking unit 70 performs a clocking operation in synchronization with the clock signal CLK3 generated on the basis of the clock signal CLK1, so as to generate clocking data which is updated in a cycle longer than the cycle in which the pieces of clocking data T1 and T0 are updated, for example, clocking data T2 indicating a time in the second unit to clocking data T8 indicating a time in the year unit.

The interface circuit 80 is an interface circuit for communication between the clocking device 1 and the master control device 2, and receives various commands from the master control device 2. Writing or reading various pieces of data for the storage circuit 90, generation of various control signals, reading of clocking data from the lower clocking unit 50 and the higher clocking unit 70, and the like are performed in response to the received commands. The interface circuit 80 may be, for example, an interface circuit compatible with various serial buses such as a serial peripheral interface (SPI) or an inter-integrated circuit (I²C), and may be an interface circuit compatible with parallel buses.

In the present embodiment, in a case where a clocking data read command in which an address is designated is received, the interface circuit 80 makes one of read enable signals E0 to E8 active (for example, a high level) according to the address designated in the received command. The lower clocking unit 50 outputs the clocking data T0 to the interface circuit 80 in a case where the read enable signal E0 is made active, and outputs the clocking data T1 to the interface circuit 80 in a case where the read enable signal E1 is made active. Similarly, in a case where the read enable signals E2 to E8 are made active, the higher clocking unit 70 outputs the pieces of clocking data T2 to T8 to the interface circuit 80. The interface circuit 80 transmits any one of the pieces of clocking data T0 to T8 output from the lower clocking unit 50 or the higher clocking unit 70 to the master control device (an example of an "external device"). In a case where a clocking data read command is received, the interface circuit 80 may sequentially make the read enable signals E0 to E8 active, so as to sequentially acquire the pieces of clocking data T0 to T8, and to continuously transmit the pieces of clocking data T0 to T8 to the master control device 2.

In the present embodiment, in a case where an offset setting command in which offset data in the unit of 1/1000 seconds in a range from −999 milliseconds to +999 milliseconds used for clocking in the lower clocking unit 50 is designated is received, the interface circuit 80 writes the offset data designated in the received command to an offset register 91 included in the storage circuit 90, and makes a flag set signal FS active (for example, a high level) and outputs the flag set signal FS to the lower clocking unit 50. Offset data OFS held in the offset register 91 is supplied to the lower clocking unit 50, and is cleared to zero in a case where a clear signal CLR1 output from the lower clocking unit 50 is made active.

The storage circuit 90 is configured to include a register group including the offset register 91, and a nonvolatile memory storing various control data such as the capacitance selection data. Each piece of data stored in the nonvolatile memory is transmitted to and held in each register from the nonvolatile memory when the clocking device 1 is activated, and each unit of the clocking device 1 is controlled according to the data held in each register. The nonvolatile memory may be, for example, various rewritable nonvolatile memories such as an electrically erasable programmable read only memory (EEPROM) or a flash memory, and may be various unrewritable nonvolatile memories such as a one-time programmable read only memory (PROM).

The adjustment circuit 40 delays pulses included in the clock signal CLK1 such that clocking data is not changed in a period in which the clocking data is read while the clocking data is being read from the lower clocking unit 50 or the higher clocking unit 70. In other periods, the adjustment circuit 40 outputs the clock signal CLK1 supplied from the frequency division circuit 20 without change. Similarly, the adjustment circuit 60 delays pulses included in the clock signal CLK3 such that clocking data is not changed in a period in which the clocking data is read while the clocking data is being read from the higher clocking unit 70. In other periods, the adjustment circuit 60 outputs the clock signal CLK3 supplied from the lower clocking unit 50 without change. In a case where the interface circuit 80 necessarily continuously transmits the clocking data T0 to T8 to the master control device 2, the adjustment circuit 40 delays pulses included in the clock signal CLK1 during that time, and thus the adjustment circuit 60 may be omitted.

The power source switching circuit 100 outputs a power source voltage VA in a case where the power source voltage VA of a predetermined voltage value or more is supplied from the main power source 4 as a power source voltage (operation voltage) for each unit of the clocking device 1, and performs switching so as to output a power source voltage VB output from the backup power source 5 in a case where the power source voltage VA from the main power source 4 is less than the predetermined voltage value. In other words, the clocking device 1 can continuously perform the clocking operation by using the power source voltage VB supplied from the backup power source 5 with the power source switching circuit 100 even in a state in which the desired power source voltage VA is not supplied from the main power source 4.

Configuration and Operation of Higher Clocking Unit

Figure 4:
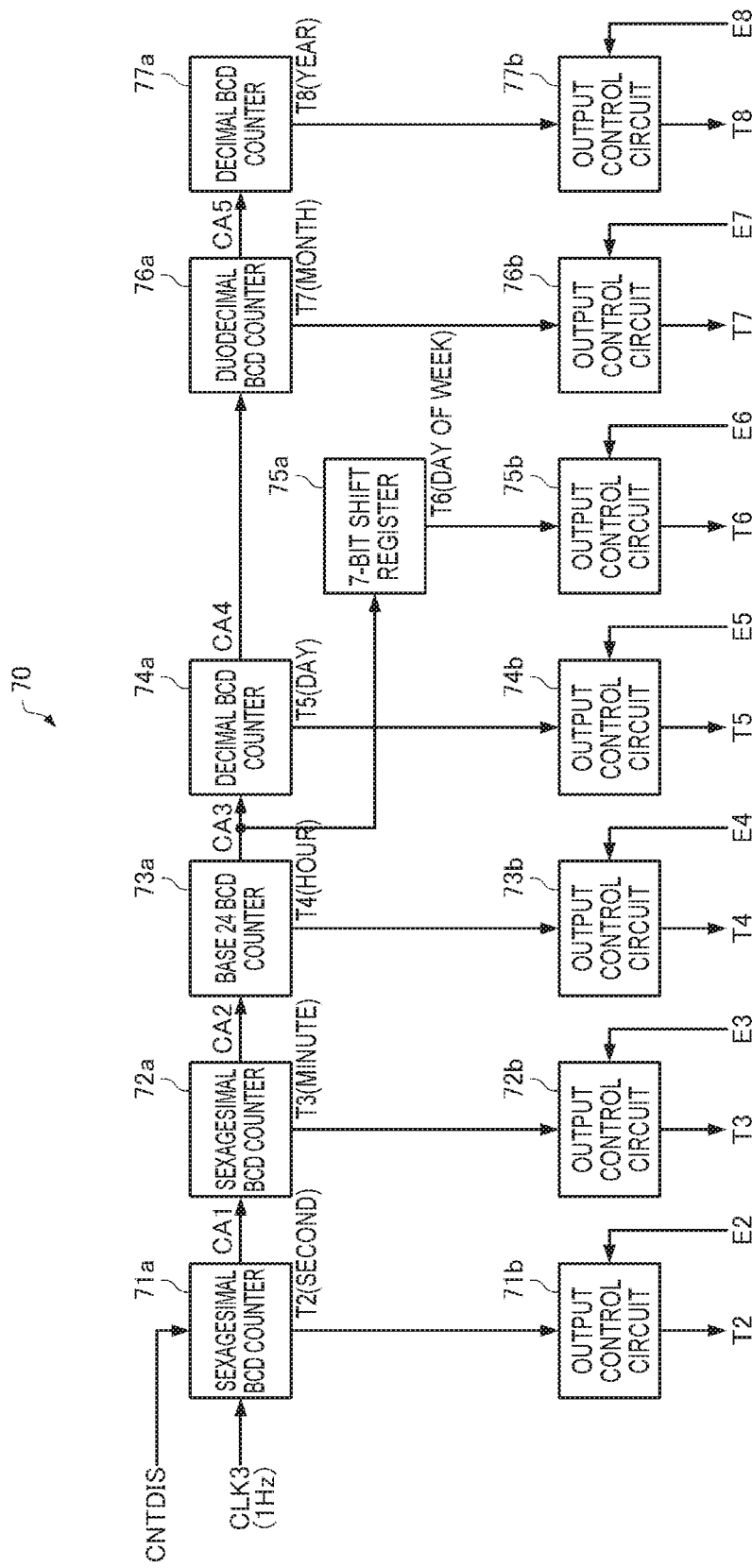
FIG. 4 is a diagram illustrating a configuration example of a higher clocking unit.

FIG. 4 is a diagram illustrating a configuration example of the higher clocking unit 70. As illustrated in FIG. 4, the higher clocking unit 70 is configured to include counters 71*a* to 74*a*, a shift register 75*a*, counters 76*a* and 77*a*, and output control circuits 71*b* to 77*b*. Each of the output control circuits 71*b* to 77*b* is formed of, for example, a plurality of transmission gates.

The counter 71*a* (an example of a "second clocking circuit") performs a count operation in synchronization with the clock signal CLK3 so as to generate a count value indicating a time in the second unit. For example, the counter 71*a* is a sexagesimal binary coded decimal (BCD) counter, and sequentially generates BCD count values indicating decimal numbers "0" to "59" in synchronization with pulses of the clock signal CLK3. In a case where a count value is the same as a value indicating the decimal number "59", the counter 71*a* resets a count value to "0" and outputs a carry signal CA1, in synchronization with the next pulse of the clock signal CLK3. However, in a case where the count disable signal CNTDIS is active, the counter 71*a* does not perform a count operation and holds a BCD count value at that time even if pulses of the clock signal CLK3 are supplied.

The count value generated by the counter 71*a* is used as the clocking data T2 (an example of "second clocking data") indicating a time in the second unit. In other words, the counter 71*a* updates the clocking data T2 in the unit of one second. In a case where the read enable signal E2 becomes active, the output control circuit 71*b* outputs the clocking data T2 generated by the counter 71*a* to the interface circuit 80.

The counter 72*a* performs a count operation in synchronization with the carry signal CA1 so as to generate a count value indicating a time in the minute unit. For example, the counter 72*a* is a sexagesimal BCD counter, and sequentially generates BCD count values indicating decimal numbers "0" to "59" in synchronization with pulses of the carry signal CA1. In a case where a count value is the same as a value indicating the decimal number "59", the counter 72*a* resets a count value to "0" and outputs a carry signal CA2, in synchronization with the next pulse of the carry signal CA1.

The count value generated by the counter 72*a* is used as the clocking data T3 indicating a time in the minute unit. In other words, the counter 72*a* updates the clocking data T3 in the minute unit. In a case where the read enable signal E3 becomes active, the output control circuit 72*b* outputs the clocking data T3 generated by the counter 72*a* to the interface circuit 80.

The counter 73*a* performs a count operation in synchronization with the carry signal CA2 so as to generate a count value indicating a time in the hour unit. For example, the counter 73*a* is a base 24 BCD counter, and sequentially generates BCD count values indicating decimal numbers "0" to "23" in synchronization with pulses of the carry signal CA2. In a case where a count value is the same as a value indicating the decimal number "23", the counter 73*a* resets a count value to "0" and outputs a carry signal CA3, in synchronization with the next pulse of the carry signal CA2.

The count value generated by the counter 73*a* is used as the clocking data T4 indicating a time in the hour unit. In other words, the counter 73*a* updates the clocking data T4 in the hour unit. In a case where the read enable signal E4 becomes active, the output control circuit 73*b* outputs the clocking data T4 generated by the counter 73*a* to the interface circuit 80.

The counter 74*a* performs a count operation in synchronization with the carry signal CA3 so as to generate a count value indicating a time in the day unit. For example, the counter 74*a* is a decimal BCD counter, and sequentially generates BCD count values indicating decimal numbers "1" to "31" in synchronization with pulses of the carry signal CA3.

However, the last day of a month is required to be "28" or "30" depending on a month, and, in a case of February of a leap year, the last day of the month is required to be "29". Therefore, the counter 74*a* compares a count value indicating a time in the day unit with a count upper limit value which is set on the basis of a count value indicating a time in the month unit and a count value indicating a time in the year unit. In a case where the count value is the same as the count upper limit value, the counter 74*a* resets a count value to "1" and outputs a carry signal CA4, in synchronization with the next pulse of the carry signal CA3.

The count value generated by the counter 74*a* is used as the clocking data T5 indicating a time in the day unit. In other words, the counter 74*a* updates the clocking data T5 in the day unit. In a case where the read enable signal E5 becomes active, the output control circuit 74*b* outputs the clocking data T5 generated by the counter 74*a* to the interface circuit 80.

The shift register 75*a* generates the clocking data T6 indicating a day of the week in synchronization with the carry signal CA3. For example, the shift register 75*a* is a 7-bit shift register including seven D type flip-flops connected to each other in a ring shape. The seven flip-flops respectively correspond to seven days of the week such as Sunday to Saturday.

When an initial state is set, the interface circuit 80 sets data of a single flip-flop to "1", and resets data of other flip-flops to "0", according to 7-bit initial value data supplied from the master control device 2. Next, the shift register 75*a* shifts day-of-week data in one direction in synchronization with the carry signal CA3. Therefore, the current day of the week is indicated by a position of the data "1" in the seven flip-flops of the shift register 75*a*.

The day-of-week data generated by the shift register 75*a* is used as the clocking data T6 indicating a day of the week. In other words, the shift register 75*a* updates the clocking data T6 in the day unit. In a case where the read enable signal E6 becomes active, the output control circuit 75*b* outputs the clocking data T6 generated by the shift register 75*a* to the interface circuit 80.

The counter 76*a* performs a count operation in synchronization with the carry signal CA4 so as to generate a count value indicating a time in the month unit. For example, the counter 76a is a duodecimal BCD counter, and sequentially generates BCD count values indicating decimal numbers "1" to "12" in synchronization with pulses of the carry signal CA4. In a case where a count value is the same as a value indicating the decimal number "12", the counter 76a resets a count value to "1" and outputs a carry signal CA5, in synchronization with the next pulse of the carry signal CA4.

The count value generated by the counter 76a is used as the clocking data T7 indicating a time in the month unit. In other words, the counter 76a updates the clocking data T7 in the month unit. In a case where the read enable signal E7 becomes active, the output control circuit 76b outputs the clocking data T7 generated by the counter 76a to the interface circuit 80.

The counter 77a performs a count operation in synchronization with the carry signal CA5 so as to generate a count value indicating a time in the year unit. For example, the counter 77a is a decimal BCD counter, and sequentially generates BCD count values indicating lower two digits of decimal numbers "2015", "2016", "2017", . . . in a case of Christian era in synchronization with pulses of the carry signal CA5.

The count value generated by the counter 77a is used as the clocking data T8 indicating a time in the year unit. In other words, the counter 77a updates the clocking data T8 in the year unit. In a case where the read enable signal E8 becomes active, the output control circuit 77b outputs the clocking data T8 generated by the counter 77a to the interface circuit 80.

Configuration and Operation of Lower Clocking Unit

Figure 5:
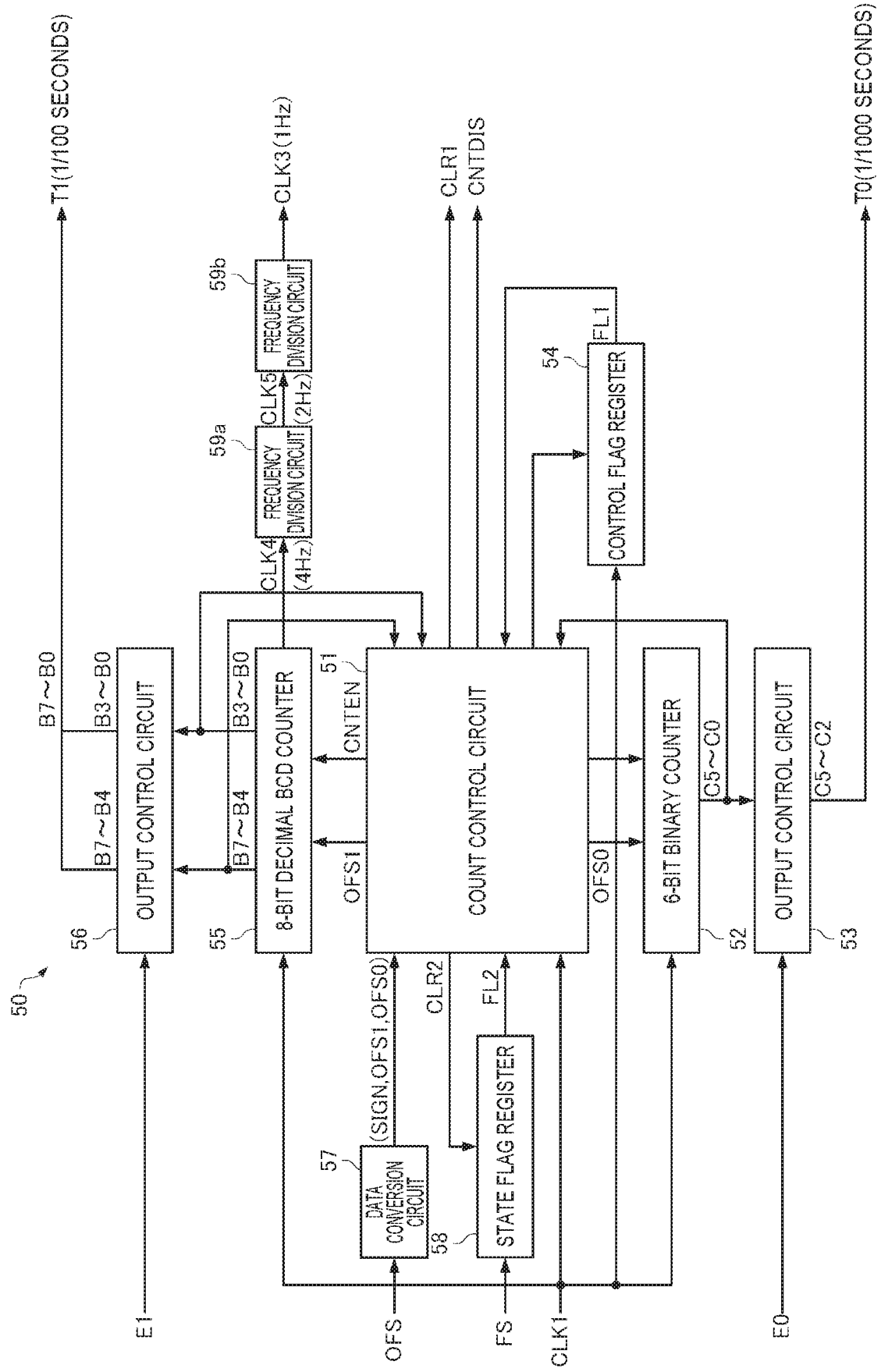
FIG. 5 is a diagram illustrating a configuration example of a lower clocking unit in the first embodiment.

FIG. 5 is a diagram illustrating a configuration example of the lower clocking unit 50. As illustrated in FIG. 5, the lower clocking unit 50 is configured to include a count control circuit 51, a counter 52, an output control circuit 53, a control flag register 54, a counter 55, an output control circuit 56, a data conversion circuit 57, a state flag register 58, and frequency division circuits 59a and 59b.

The counter 52 is formed of, for example, a 6-bit binary counter. Since the counter 52 performs a clocking operation in the unit of 1/100 seconds, the counter 52 performs a count operation in synchronization with pulses of the clock signal CLK1 having the frequency of 4096 Hz, so as to generate count values such as 6 bits C5 to C0 indicating decimal numbers "0" to "39" in the respective count cycles. Here, C5 is the most significant bit, and C0 is the least significant bit.

The output control circuit 53 is formed of, for example, a plurality of transmission gates. In a case where the read enable signal E0 becomes active, the output control circuit 53 outputs the higher 4 bits C5 to C2 of a count value generated by the counter 52 to the interface circuit 80 as the 4-bit clocking data T0 indicating a time in the unit of 1/1000 seconds.

Since one cycle of the clock signal CLK1 is about 244 microseconds, the higher 4 bits C5 to C2 of a count value in the counter 52 are selected, and thus the clocking data T0 indicating a time in the unit of 1/1000 seconds is generated. As mentioned above, according to the present embodiment, higher 4 bits "0000" to "1001" of 6-bit count values "000000" to "100111" generated through the clocking operation in the unit of 1/100 seconds are selected, and thus it is possible to generate the 4-bit clocking data T0 indicating decimal numbers "0" to "9" as a time in the unit of 1/1000 seconds without increasing current consumption much with a simple circuit configuration.

However, four cycles of the clock signal CLK1 include an error of about −23.4 microseconds with respect to 1/1000 seconds. In order to remove this error, the count operation performed by the counter 52 includes a 40-count cycle in which a count value sequentially changes from "0" to "39" and then returns to "0", and a 41-count cycle in which a count value becomes "39" consecutively twice and then returns to "0". Therefore, the lower clocking unit 50 is provided with the control flag register 54 which stores a 1-bit count control flag FL1 indicating information regarding the fortieth count. The control flag register 54 is formed of, for example, a D type flip-flop.

When an initial state is set, the count control circuit 51 sets a count initial value supplied from the interface circuit 80 in the counter 52 and the counter 55, and resets the count control flag FL1 stored in the control flag register 54 to "0". The count control circuit 51 is formed of, for example, a state machine including a sequential circuit.

A count value such as the 6 bits C5 to C0 generated by the counter 52 is also supplied to the count control circuit 51. In a case where a count cycle is a predetermined number of times, if a count value generated by the counter 52 is the same as a value indicating the decimal number "39", the count control circuit 51 sets the count control flag FL1 to "1". Consequently, first state transition is set in which the counter 52 maintains a count value even if the next pulse of the clock signal CLK1 arrives, and resets a count value to "0" in synchronization with a pulse following the next pulse of the clock signal CLK1.

On the other hand, in a case where a count cycle is not a predetermined number of times, even if a count value generated by the counter 52 is the same as a value indicating the decimal number "39", the count control circuit 51 maintains the count control flag FL1 to be "0". Consequently, second state transition is set in which the counter 52 resets a count value to "0" in synchronization with the next pulse of the clock signal CLK1.

In the 41-count cycle, a period of one count cycle corresponds to 41 cycles of the clock signal CLK1 having the frequency of 4096 Hz, and is thus about 10.01 milliseconds. On the other hand, in the 40-count cycle, a period of one count cycle corresponds to 40 cycles of the clock signal CLK1, and is thus about 9.77 milliseconds. Therefore, among consecutive hundred count cycles, the count control circuit 51 sets ninety-six 41-count cycles, and four 40-count cycles. Therefore, an error between the 41-count cycle and the 40-count cycle can be reduced, and thus it is possible to reduce an error of a time indicated by clocking data.

For example, in a case where count values generated by the counter 52 are the same as a value indicating the decimal number "39" in cycles other than a thirteenth cycle, a thirty-eighth cycle, a sixty-third cycle, and an eighty-eighth cycle among consecutive hundred cycles, the count control circuit 51 sets the count control flag FL1 to "1" so as to set the first state transition. In the first state transition, the count control circuit 51 stops the count operation of the counter 52, and resets the count control flag FL1 to "0" in synchronization with the next pulse of the clock signal CLK1. The count control circuit 51 cancels the stoppage of the count operation of the counter 52 and resets a count value to "0" in synchronization with a pulse following the next pulse of the clock signal CLK1, and makes a count enable signal CNTEN active (for example, a high level) during the only one pulse. Consequently, the 41-count cycle is realized.

For example, in a case where count values generated by the counter 52 are the same as a value indicating the decimal number "39" in the thirteenth cycle, the thirty-eighth cycle, the sixty-third cycle, and the eighty-eighth cycle among the consecutive hundred cycles, the count control circuit 51 maintains the count control flag FL1 to be "0" so as to set the second state transition. In the second state transition, the count control circuit 51 resets a count value in the counter 52 to "0" in synchronization with the next pulse of the clock signal CLK1, and makes the count enable signal CNTEN active during the only one pulse. Consequently, the 40-count cycle is realized.

As mentioned above, the counter 52 selects 40 and 41 in the ratio of 4 to 96, and counts the number of pulses of the clock signal CLK1 having the frequency of 4096 Hz in 6 bits. The lower clocking unit 50 outputs a higher 4-bit count value of a 6-bit count value output from the counter 52 as the clocking data T0 of the pieces of clocking data T1 and T0. Therefore, the lower clocking unit 50 selects higher 4-bit count values "0000" to "1001" of 6-bit count values "000000" to "100111" counted by the counter 52, and can thus output the clocking data T0 indicating decimal numbers "0" to "9" as a time in the unit of $1/1000$ seconds without increasing current consumption much with a simple circuit configuration.

The count enable signal CNTEN output from the count control circuit 51 is supplied to the counter 55. The counter 55 performs a count operation in synchronization with the clock signal CLK1 when the count enable signal CNTEN is active, so as to generate a count value indicating a time in the unit of $1/100$ seconds.

The counter 55 is formed of, for example, an 8-bit decimal BCD counter. A BCD count value generated by the counter 55 includes 4 bits B7 to B4 indicating the place of $1/10$ seconds of the decimal number and 4 bits B3 to B0 indicating the place of $1/100$ seconds of the decimal number.

The counter 55 sequentially generates count values indicating decimal numbers "0" to "99" in synchronization with pulses of the clock signal CLK1 when the count enable signal CNTEN is active. In a case where a count value is the same as a value indicating the decimal number "99", the counter 55 resets a count value to "0" in synchronization with a pulse of the clock signal CLK1 when the count enable signal CNTEN becomes active next.

A period in which the counter 55 counts a hundred is $4096^{-1} \times (41 \times 96 + 40 \times 4) = 1$ second. A period in which the counter 55 counts one includes an error of about ±117 microseconds to the maximum, but accurately corresponds to the period of $1/100$ seconds in the long term.

The higher 4 bits B7 to B4 and the lower 4 bits B3 to B0 of a count value generated by the counter 55 are used as the clocking data T1 indicating a time in the unit of $1/100$ seconds. The output control circuit 56 is formed of, for example, a plurality of transmission gates, and outputs the clocking data T1 generated by the counter 55 to the interface circuit 80 in a case where the read enable signal E1 becomes active.

In hundred count cycles in each of which decimal numbers "0" to "99" are counted, the counter 55 sets four cycles of outputting only a leading pulse of the supplied clock signal CLK1 without change and sets ninety-six cycles of not outputting pulses of the clock signal CLK1, so as to output a clock signal CLK4 having the frequency of 4 Hz. For example, the counter 55 outputs the leading pulse of the clock signal CLK1 only in four cycles in which count values are decimal numbers "0", "25", "50", and "75", so as to generate the clock signal CLK4 on the basis of the clock signal CLK1.

The frequency division circuit 59a frequency-divides the clock signal CLK4 having the frequency of 4 Hz by 2 so as to generate a clock signal CLK5 having the frequency of 2 Hz. The frequency division circuit 59b frequency-divides the clock signal CLK5 having the frequency of 2 Hz by 2 so as to generate the clock signal CLK3 having the frequency of 1 Hz. A rising timing of the clock signal CLK3 matches a timing at which a count value in the counter 55 is updated from the decimal number "99" to "0".

The data conversion circuit 57 converts the offset data OFS in the unit of $1/1000$ seconds in the range from −999 milliseconds to +999 milliseconds, stored in the offset register 91, into a signed 13-bit BCD offset value which is then output. The signed 13-bit BCD offset value has a twelfth bit which is a sign value SIGN, eleventh to fourth bits which are offset values OFS1 set in the bits B7 to B0 of the counter 55, and third to zeroth bits which are offset values OFS0 set in the bits C5 to C2 of the counter 52. In a case where the offset data OFS is within the range of 0 to +999 milliseconds, the sign value SIGN is "0", and the offset values OFS1 and the offset values OFS0 respectively correspond to numerical values of higher two digits and a numerical value of a lower one digit of the decimal number corresponding to the offset data OFS. For example, in a case where the offset data OFS is +123 milliseconds, a 13-bit BCD offset value is "0000100100011" (corresponding to +123). On the other hand, in a case where the offset data OFS is within the range of −999 milliseconds to −1 millisecond, the sign value SIGN is "1", and the offset values OFS1 and the offset values OFS0 respectively correspond to numerical values of higher two digits and a numerical value of a lower one digit of the decimal number obtained by subtracting the decimal number corresponding to the offset data OFS from the decimal number "1000". For example, in a case where the offset data OFS is +123 milliseconds, a 13-bit BCD offset value is "1100001110111" (corresponding to −877).

The state flag register 58 stores a state flag FL2. The state flag FL2 is set to "1" in a case where the flag set signal FS changes from an inactive state to an active state. The state flag register 58 is formed of, for example, a set/reset (SR) type flip-flop.

In a case where the state flag FL2 is "1" at a timing at which the count enable signal CNTEN becomes active when a count value in the counter 55 is the decimal number "99", in synchronization with pulses of the clock signal CLK1, the count control circuit 51 updates the bits B7 to B0 of the count value in the counter 55 to the offset values OFS1, and updates the bits C5 to C2 of a count value in the counter 52 to the offset values OFS0 so as to update the bits C1 and C0 to "00". Simultaneously, the count control circuit 51 outputs the clear signal CLR1 during only one pulse of the clock signal CLK1, and thus the offset data OFS is cleared to zero by the clear signal CLR1. In a case where the sign value SIGN is "1", the count control circuit 51 makes the count disable signal CNTDIS active between pulses of the clock signal CLK1, and does not output pulses of the clock signal CLK4 having the frequency of 4 Hz. Through the process (offset setting process) of updating the respective count values in the counter 55 and the counter 52 to the offset values OFS1 and OFS0, an update timing of the clocking data T2 (second) from the higher clocking unit 70 can be changed in the unit of $1/1000$ seconds. The offset setting process is performed in preference to count operations (operations in which a count value advances by 1) of the counter 55 and the counter 52.

Figure 6:
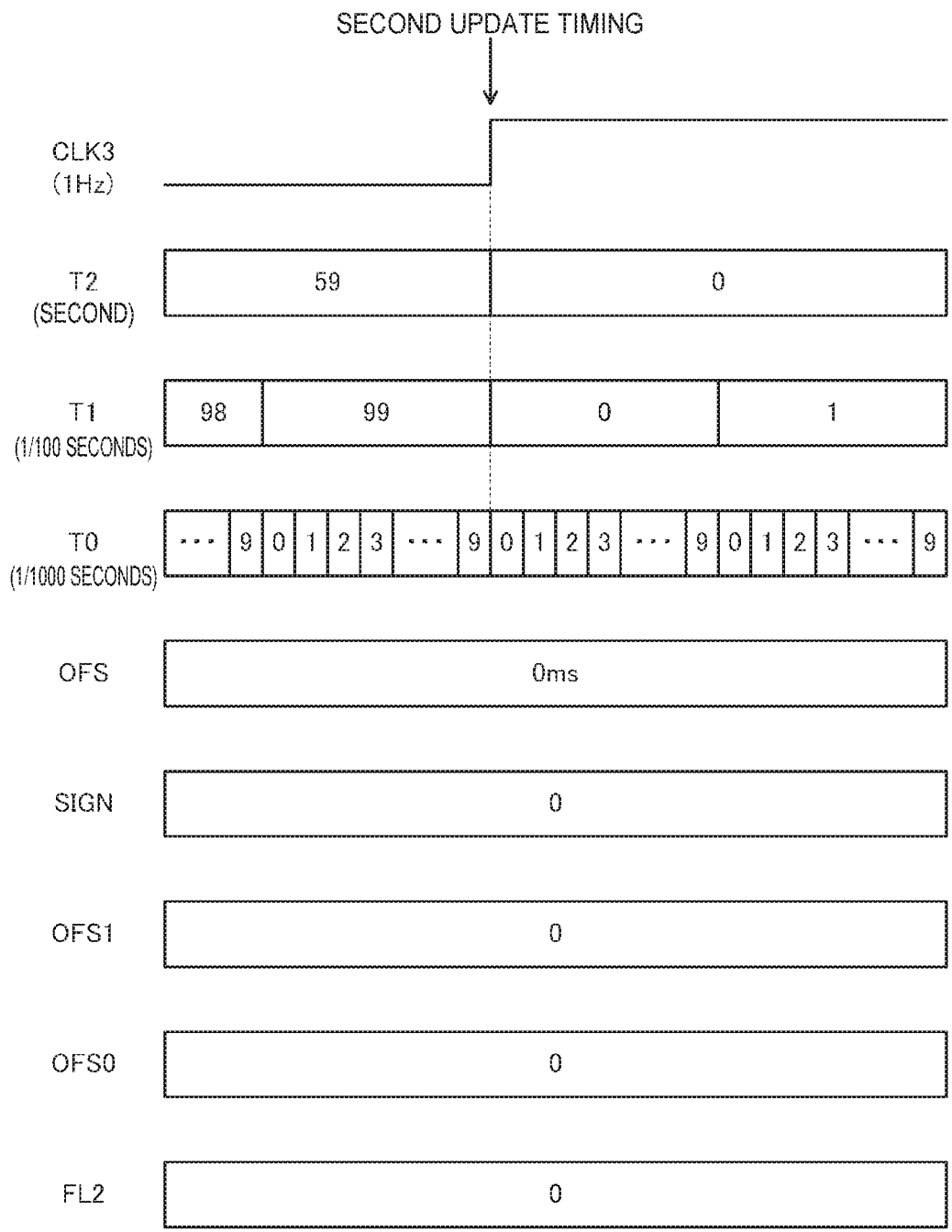
FIG. 6 is a diagram illustrating an example of a timing chart before and after second update.
Figure 7:
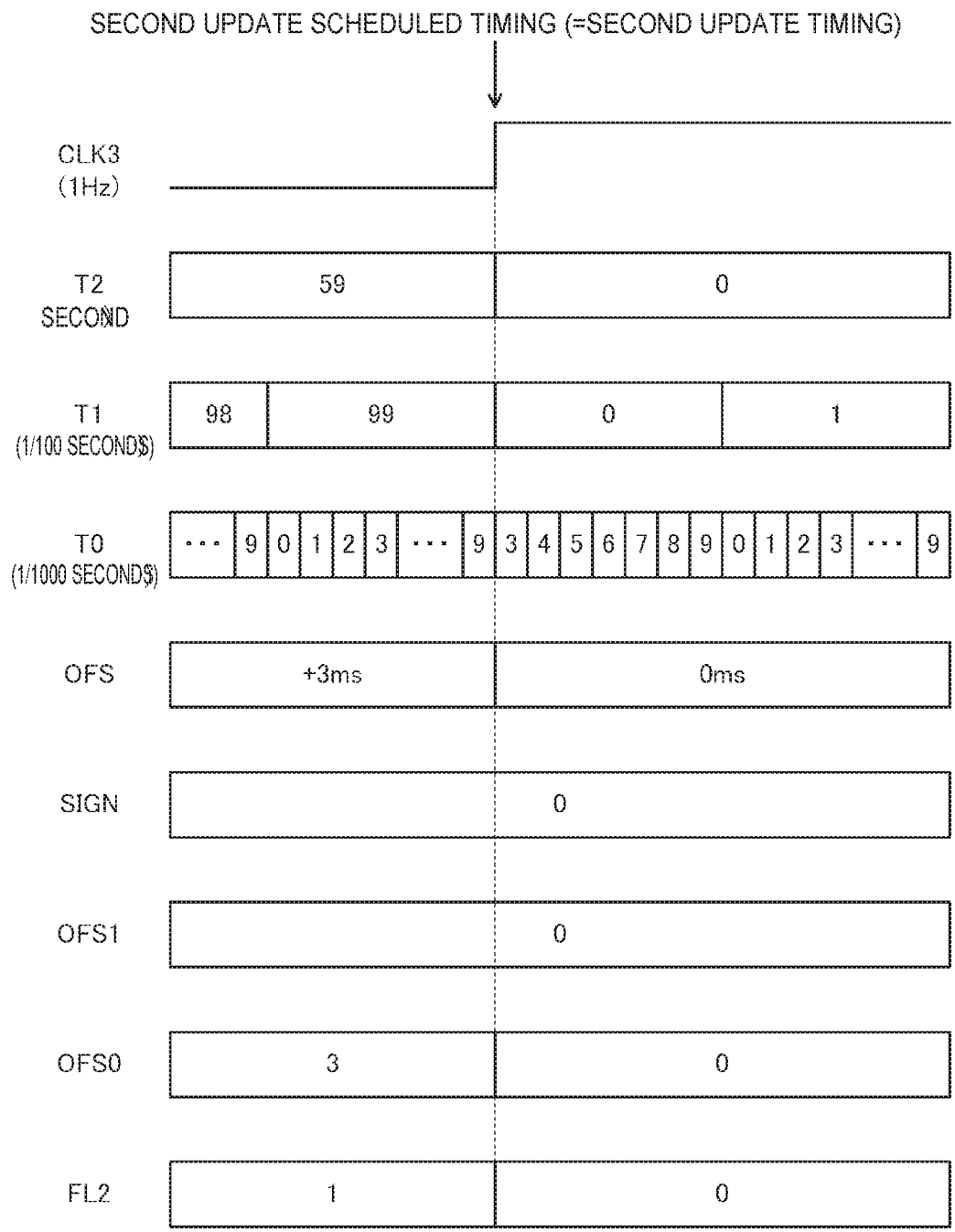
FIG. 7 is a diagram illustrating another example of a timing chart before and after second update.
Figure 8:
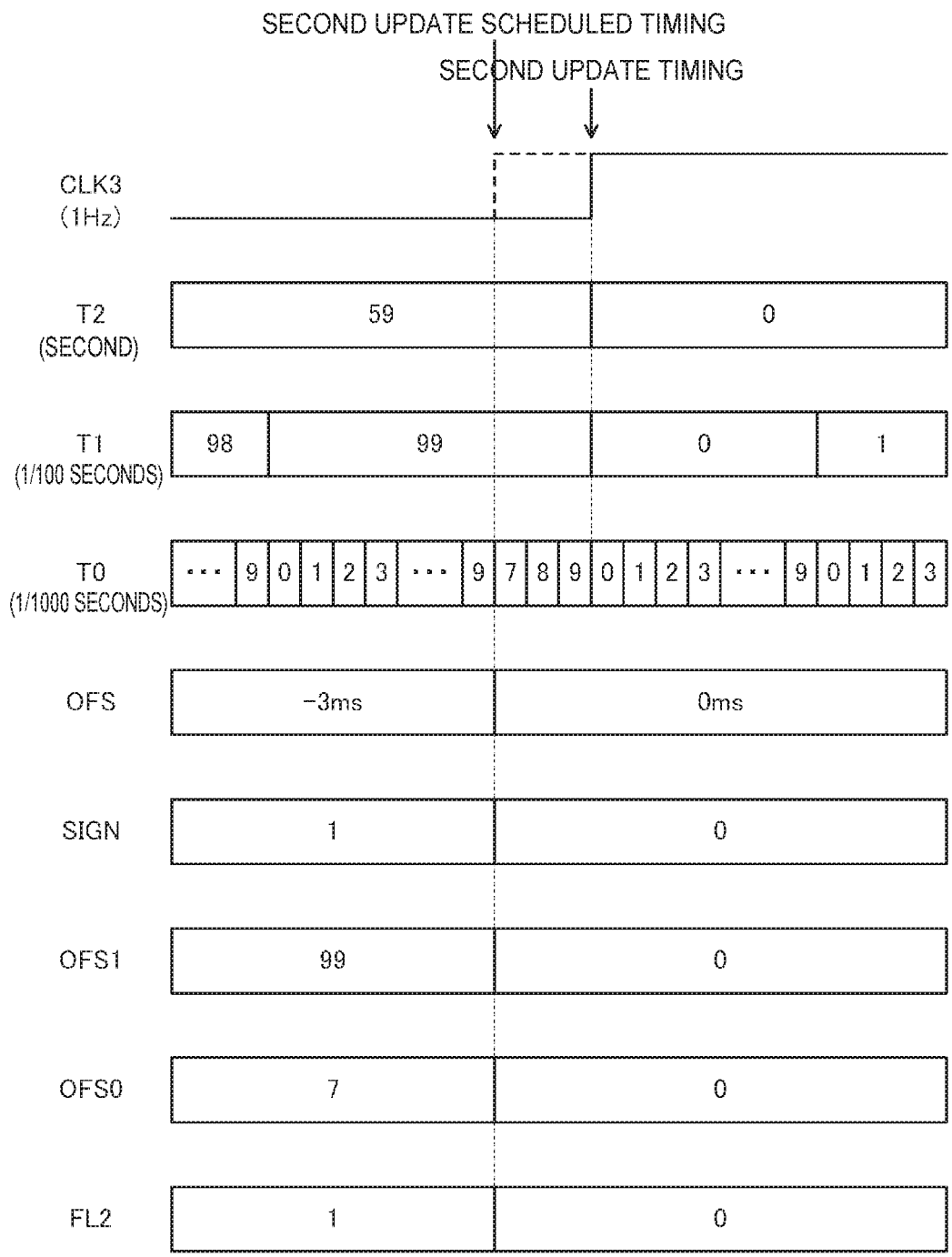
FIG. 8 is a diagram illustrating still another example of a timing chart before and after second update.

FIG. 6 is a diagram illustrating an example of a timing chart before and after second update in a case where the offset setting process is not performed. FIGS. 7 and 8 are diagrams illustrating an example of a timing chart before and after second update in a case where the offset setting process is performed.

In the example illustrated in FIG. 6, the clocking data T2 (second) is updated from "59" to "0" at a timing (second update timing) at which the clocking data T1 (1/100 seconds) is updated from "99" to "0", and the clocking data T0 (1/1000 seconds) is updated from "9" to "0".

In contrast, in the example illustrated in FIGS. 7 and 8, when the clocking data T1 (1/100 seconds) is "99", and the clocking data T0 (1/1000 seconds) is "9" (when the pieces of clocking data T1 and T0 are a predefined predetermined value "999"), that is, at a timing (second update scheduled timing) at which the clocking data T2 (second) is scheduled to be updated, the lower clocking unit 50 sets the offset values OFS1 and OFS0 in the pieces of clocking data T1 (1/100 seconds) and T0 (1/1000 seconds), and thus an update timing of the clocking data T2 (second) is corrected. Thus, in the example illustrated in FIG. 7, in synchronization with the clock signal CLK1 (not illustrated), the clocking data T1 (1/100 seconds) is updated from "99" to "0" (offset value OFS1), and the clocking data T0 (1/1000 seconds) is updated from "9" to "3" (offset value OFS0). The clocking data T2 (second) is updated from "59" to "0" at the second update scheduled timing. In other words, in a case where the sign value SIGN is "0" (the offset data OFS is zero or a positive value), a timing (second update scheduled timing) of the offset setting process matches the second update timing.

On the other hand, in the example illustrated in FIG. 8, at the second update scheduled timing, the clocking data T1 (1/100 seconds) is maintained to be "99" ("99" offset value OFS1) is set), and the clocking data T0 (1/1000 seconds) is updated from "9" to "7" (offset value OFS0) in synchronization with the clock signal CLK1 (not illustrated). The clocking data T2 (second) is maintained to be "59" at the second update scheduled timing, and is updated from "59" to "0" after 3/1000 seconds. In other words, when the sign value SIGN is "1" (the offset data OFS is a negative value), the second update timing is later than the timing (second update scheduled timing) of the offset setting process.

Clocking Correction

Figure 9:
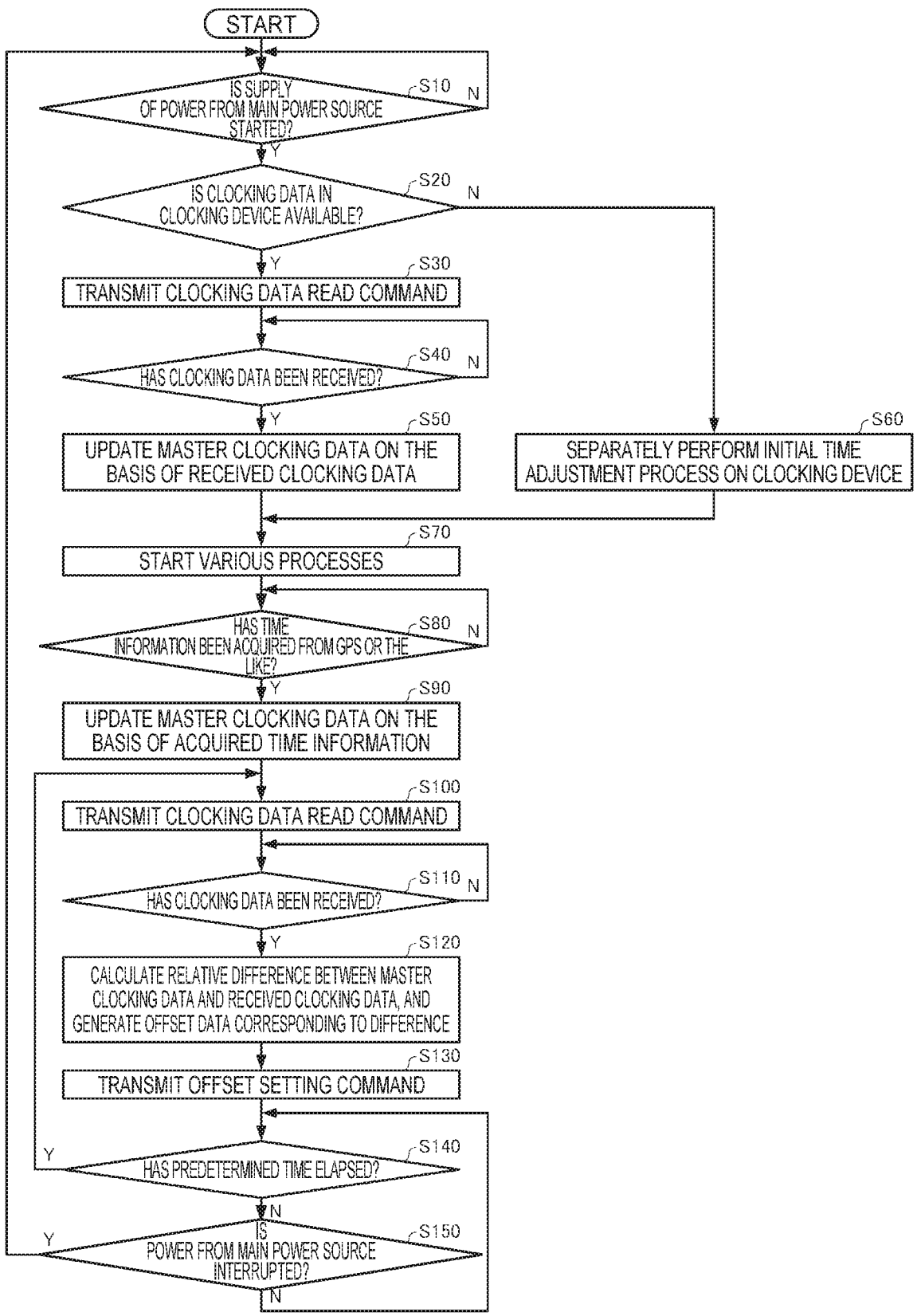
FIG. 9 is a flowchart illustrating examples of procedures of a process for clocking correction performed by a master control device.
Figure 10:
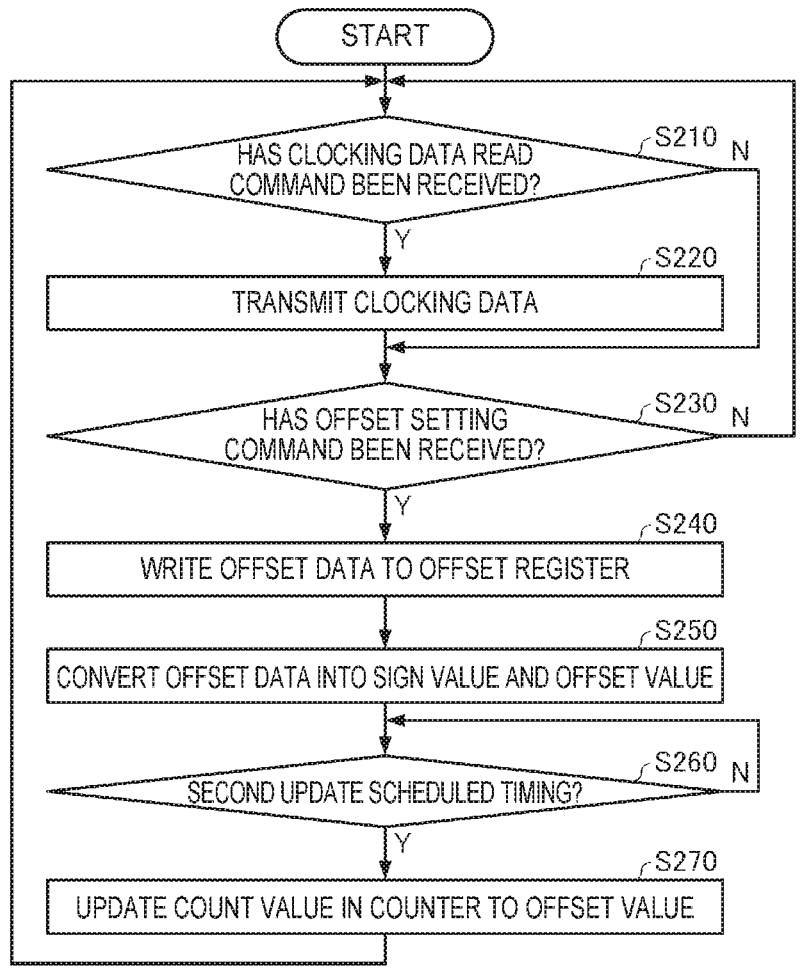
FIG. 10 is a flowchart illustrating examples of procedures of a process for clocking correction performed by a clocking device in the first embodiment.

The offset setting process performed by the clocking device 1 is used for clocking correction in the unit of 1/1000 seconds. FIG. 9 is a flowchart illustrating examples of procedures of a process for correcting clocking in the clocking device 1, performed by the master control device 2. FIG. 10 is a flowchart illustrating examples of procedures of a process for clocking correction performed by the clocking device 1.

As illustrated in FIG. 9, in a case where the supply of power from the main power source 4 is started (Y in step S10), first, the master control device 2 determines whether or not clocking data in the clocking device 1 is available (step S20). For example, the master control device 2 determines whether or not there is abnormality in a clocking operation during a backup operation of the clocking device 1 (in a period in which power from the main power source is interrupted), and determines that the clocking data in the clocking device 1 is available in a case where there is no abnormality, and determines that the clocking data is not available in a case where there is abnormality. For example, the clocking device 1 includes a circuit detecting abnormality such as oscillation stoppage in the oscillation circuit 10 or a power source voltage (an output voltage of the power source switching circuit 100) of the clocking device 1 being less than a predetermined voltage value, and stores flag information indicating an abnormality detection result in the storage circuit 90. The master control device 2 may read the flag information indicating the abnormality detection result from the clocking device 1, and may determine whether or not the clocking data in the clocking device 1 is available.

In a case where it is determined that the clocking data in the clocking device 1 is available (Y in step S20), the master control device 2 transmits a clocking data read command to the clocking device 1 (step S30).

Next, the master control device 2 waits for the clocking data to be received from the clocking device 1 (N in step S40), and, in a case where the clocking data is received (Y in step S40), the master control device 2 updates the master clocking data 200 on the basis of the received pieces of clocking data T0 to T8 (step S50). In the procedures illustrated in FIG. 9, since all of the pieces of clocking data T0 to T8 are received in steps S30 and S40, but only necessary clocking data including at least the pieces of clocking data T0 and T1 may be sequentially received.

On the other hand, in a case where it is determined that the clocking data in the clocking device 1 is not available (N in step S20), the master control device 2 separately performs an initial time adjustment process on the clocking device 1 (step S60).

Next, the master control device 2 starts various processes (step S70). For example, the master control device 2 performs a process of distributing the master clocking data 200 to the respective slave devices 3.

Next, the master control device 2 waits for time information to be acquired from a GPS or a network (N in step S80), and, in a case where the time information is acquired (Y in step S80), the master control device 2 updates the master clocking data 200 on the basis of the acquired time information (step S90).

Next, the master control device 2 transmits a clocking data read command to the clocking device 1 (step S100).

Next, the master control device 2 waits for clocking data to be received from the clocking device 1 (N in step S110), and, in a case where the clocking data is received (Y in step S110), the master control device 2 calculates relative differences between the master clocking data 200 and the received pieces of clocking data T0 to T8 so as to generate offset data corresponding to the differences (step S120). In a case where the pieces of clocking data T0 to T8 delay compared with the master clocking data 200, the master control device 2 generates offset data of a positive value corresponding to a delay time. In a case where the pieces of clocking data T0 to T8 advance compared with the master clocking data 200, the master control device 2 generates offset data of a negative value corresponding to an advance time.

Next, the master control device 2 transmits an offset setting command in which the generated offset data is designated to the clocking device 1 (step S130). Consequently, in the clocking device 1, an offset setting process is performed, and thus clocking correction is realized.

Next, in a case where a predetermined time has elapsed (Y in step S140), the master control device 2 repeatedly performs the processes from step S100. Here, the predetermined time corresponds to a cycle of clocking correction, and may be, for example, a time of which relative differences between the master clocking data 200 and the pieces of clocking data T0 to T8 are not equal to or more than ±1 second. In the above-described way, the pieces of clocking data T2 to T8 is not required to be reset in order to perform clocking correction, and thus a process in the master control device 2 is simplified.

On the other hand, in a case where power from the main power source 4 is interrupted before the predetermined time elapses (N in step S140 and Y in step S150), the master control device 2 waits for the supply of power from the main power source 4 to be resumed (N in step S10). In a case where the supply of power from the main power source 4 is resumed (Y in step S10), the master control device 2 performs the processes from step S20 again. The clocking device 1 continuously performs the clocking operation by using power supplied from the backup power source 5 even while power from the main power source 4 is interrupted. Therefore, the master control device 2 can update the master clocking data 200 by using the clocking data T0 to T8 with relatively high accuracy having undergone clocking correction in the process in step S130 performed in the previous time, from the clocking device 1 right after the supply of power from the main power source 4 is resumed. Thereafter, the master control device 2 may acquire time information from the GPS or the network so as to update the master clocking data 200 to an accurate time, and may perform clocking correction on the clocking device 1 on the basis of the updated master clocking data 200.

In contrast, as illustrated in FIG. 10, in a case where the clocking data read command transmitted by the master control device 2 in step S30 or step S100 in FIG. 9 is received (Y in step S210), the clocking device 1 transmits the pieces of clocking data T0 to T8 to the master control device 2 (step S220).

In a case where the offset setting command transmitted by the master control device 2 in step S130 in FIG. 9 is received (Y in step S230), first, the clocking device 1 writes the offset data designated in the received offset setting command to the offset register 91 (step S240).

Next, the clocking device 1 converts the offset data OFS held in the offset register 91 into the sign value SIGN and the offset values OFS1 and OFS0 (step S250).

Next, the clocking device 1 waits for a second update scheduled timing to come (N in step S260). If the second update scheduled timing comes (Y in step S260), the clocking device 1 updates count values in the counters 55 and 52 of the lower clocking unit 50 to the offset values OFS1 and OFS0 (step S270), and performs the processes in and after step S210 again.

As mentioned above, since the master control device 2 and the clocking device 1 respectively perform the processes illustrated in FIGS. 9 and 10, the offset data OFS (an example of a "first correction value") generated by the master control device 2 is periodically stored in the storage circuit 90 (offset register 91) on the basis of the clocking data T1 and T0 and the master clocking data 200, and the offset data OFS (offset values OFS1 and OFS0) is set in the clocking data T1 and T0 at an update scheduled timing of the clocking data T2. Consequently, clocking correction in the unit of 1/1000 seconds in the clocking device 1 is periodically performed.

Advantageous Effects

As described above, in the present embodiment, the master control device 2 calculates relative differences between the clocking data T0 to T8 read from the clocking device 1 and the accurate master clocking data 200, and transmits the offset data OFS for removing the differences to the clocking device 1. The clocking device 1 receives the offset data OFS, and stores the offset data OFS in the offset register 91. The lower clocking unit 50 of the clocking device 1 sets the offset data OFS (offset values OFS1 and OFS0) stored in the offset register 91 in the pieces of clocking data T1 (1/100 seconds) and T0 (1/1000 seconds), so as to correct an update timing of the clocking data T2 (second). Specifically, the clocking device 1 sets the offset data OFS in the range from −999 millisecond to −1 millisecond so as to delay an update timing of the clocking data T2 (second) in the unit of 1/1000 seconds, and sets the offset data OFS in the range from +1 millisecond to +999 milliseconds so as to advance an update timing of the clocking data T2 (second) in the unit of 1/1000 seconds. Here, a communication delay required to read the clocking data T0 to T8 is the same every time in the unit of 1/1000 seconds, and, if the master control device 2 reads the pieces of clocking data T0 to T8 right after being corrected, differences thereof from the master clocking data 200 are zero. In other words, the clocking device 1 performs clocking deviated by the delay time required to read the clocking data T0 to T8 relative to the master clocking data 200, and thus the pieces of clocking data T0 to T8 read by the master control device 2 are brought into a matching state with the master clocking data 200 (a state in which the pieces of clocking data T0 to T8 can be used in place of the master clocking data 200). As mentioned above, according to the clocking device 1 of the first embodiment, a difference in clocking including communication delay with the master control device 2 is corrected by using the offset data OFS, and thus it is possible to perform accurate clocking correction more simply than in the related art.

1-2. Second Embodiment

Figure 11:
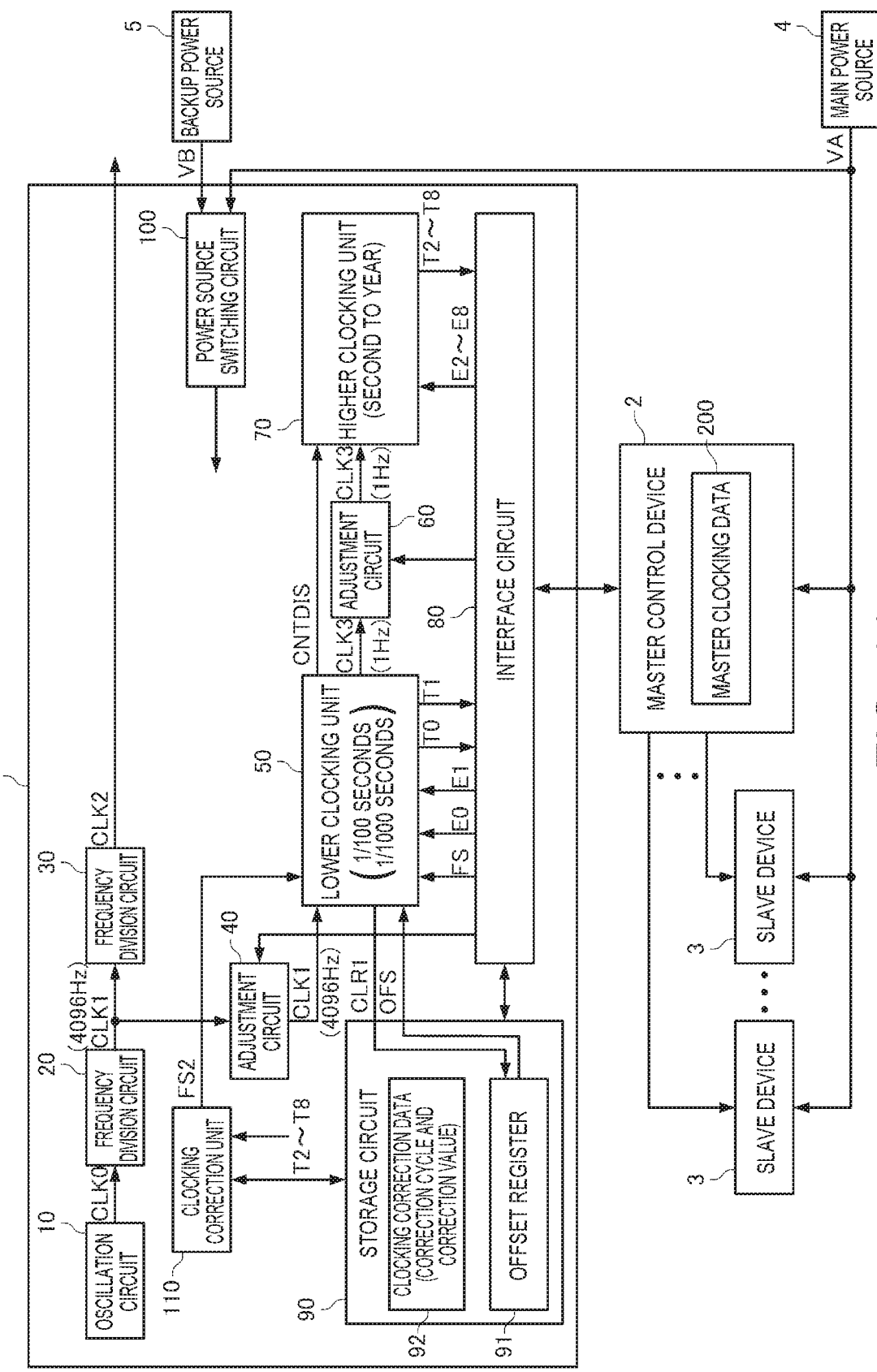
FIG. 11 is a diagram illustrating a functional block of a clocking device and a configuration example of a processing system according to a second embodiment.

FIG. 11 is a diagram illustrating a functional block of a clocking device (real-time clocking device) 1 and a configuration example of a processing system using the clocking device 1 according to a second embodiment. In FIG. 11, the same constituent element as in FIG. 1 is given the same reference numeral, and, hereinafter, the second embodiment will be described focusing on the content which is different from that of the first embodiment, and a description overlapping the first embodiment will be omitted.

As illustrated in FIG. 11, in the same manner as the clocking device 1 of the first embodiment, the clocking device of the second embodiment is configured to include an oscillation circuit 10, a frequency division circuit 20, a frequency division circuit 30, an adjustment circuit 40, a lower clocking unit 50, an adjustment circuit 60, a higher clocking unit 70, an interface circuit 80, a storage circuit 90, and a power source switching circuit 100, and further includes a clocking correction unit 110. In the clocking device 1 of the second embodiment, clocking correction data 92 is stored in the storage circuit 90.

The clocking correction data 92 is data for correcting a clocking difference generated with the passage of time, and includes information regarding a correction value (an example of a "second correction value") and information regarding a correction cycle. For example, in a case where the fact that clocking in the clocking device 1 delays (or advances) by about X seconds for a year is known in advance on the basis of information such as the accuracy of the resonator 11 or secular change of the resonator 11, clocking correction data such as a correction cycle of Y months and a correction value of +X×Y/12 seconds (or −X×Y/12 seconds) may beset. For example, Y satisfying a relationship of (X×Y/12<1) is selected such that a correction value is included in the range from −999 milliseconds to +999 milliseconds. The clocking correction data 92 (the correction value and the correction cycle) may be written to a nonvolatile memory (not illustrated) of the storage circuit 90 in advance in an inspection process or the like on the clocking device 1, and may be written to the storage circuit

90 by the master control device 2. The clocking correction data 92 (the correction value and the correction cycle) may be variable during operation of the clocking device 1.

The clocking correction unit 110 corrects the pieces of clocking data T1 (1/100 seconds) and T0 (1/1000 seconds) on the basis of the clocking correction data 92 stored in the storage circuit 90. Specifically, the clocking correction unit 110 determines whether or not a correction cycle has elapsed on the basis of the correction cycle included in the clocking correction data 92 and the clocking data T2 to T8. Whenever the correction cycle elapses, the clocking correction unit 110 writes the correction value included in the clocking correction data 92 to the offset register 91 as the offset data OFS, and outputs a flag set signal FS2 which is active (for example, a high level) to the lower clocking unit 50. The offset data OFS held in the offset register 91 is supplied to the lower clocking unit 50, and is cleared to zero in a case where the clear signal CLR1 output from the lower clocking unit 50 becomes active.

As mentioned above, in the clocking device 1 of the second embodiment, the offset register 91 is shared, clocking correction in the unit of 1/1000 seconds can be performed by receiving an offset setting command from the master control device 2 in the same manner as in the clocking device 1 of the first embodiment, and clocking correction in the unit of 1/1000 seconds can be periodically performed in a correction cycle included in the clocking correction data 92.

A value of +1 second or more or −1 second or less may be allowed as a correction value included in the clocking correction data 92. In this case, the clocking correction unit 110 may write a value of below 1 second of the correction value to the offset register 91, may correct (offset-correct) the pieces of clocking data T1 (1/100 seconds) and T0 (1/1000 seconds), and may correct at least some of the pieces of clocking data T2 (second) to T8 (year) on the basis of a value of 1 second or more of the correction value.

Figure 12:
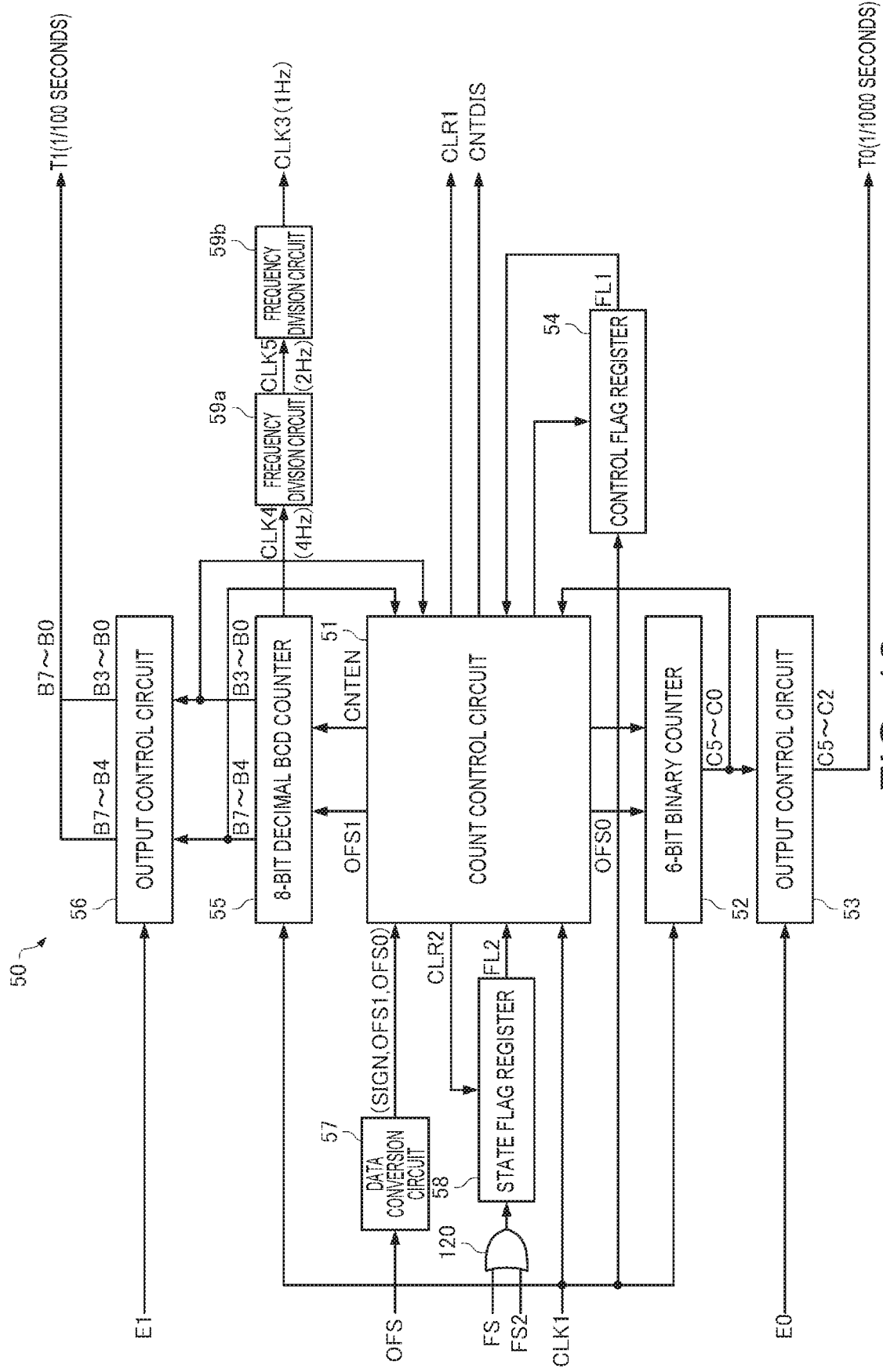
FIG. 12 is a diagram illustrating a configuration example of a lower clocking unit in the second embodiment.

FIG. 12 is a diagram illustrating a configuration example of the lower clocking unit 50 in the second embodiment. As illustrated in FIG. 12, the lower clocking unit 50 of the second embodiment is configured to include a logical sum circuit 120 in addition to the same configuration as that of the lower clocking unit 50 (FIG. 5) of the first embodiment.

The logical sum circuit 120 outputs a logical sum signal of the flag set signal FS and the flag set signal FS2. In other words, the logical sum circuit 120 outputs a high level (active) signal in a case where at least one of the flag set signal FS and the flag set signal FS2 has a high level (active), and outputs a low level (inactive) signal in a case where both of the flag set signal FS and the flag set signal FS2 have a low level (inactive). The state flag FL2 stored in the state flag register 58 is set to "1" in a case where an output signal from the logical sum circuit 120 changes from an inactive state to an active state. In other words, the state flag FL2 is set to "1" in a case where the flag set signal FS or the flag set signal FS2 changes from an inactive state to an active state.

Other configurations and functions of the lower clocking unit 50 of the second embodiment are the same as those of the lower clocking unit 50 (FIG. 5) of the first embodiment, and thus description thereof will be omitted.

In a case where, while one of clocking correction due to reception of an offset setting command and clocking correction based on the clocking correction data 92 is being performed, a start timing of the other may come, an adjustment circuit may be provided such that clocking correction of which a start timing comes later is performed after waiting for clocking correction of which a start timing first comes to be finished.

Figure 13:
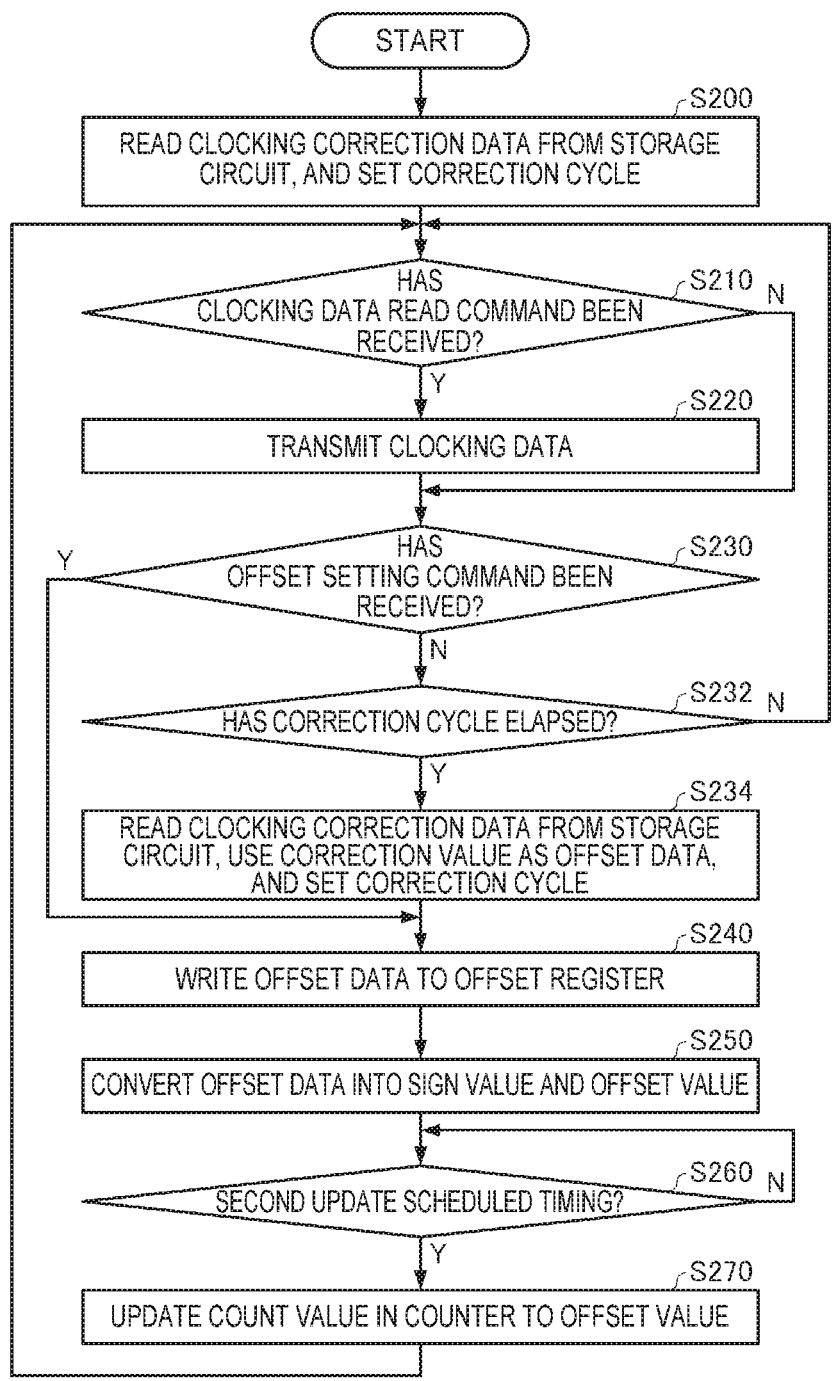
FIG. 13 is a flowchart illustrating examples of procedures of a process for clocking correction performed by a clocking device in the second embodiment.

FIG. 13 is a flowchart illustrating examples of procedures of a process for clocking correction performed by the clocking device 1 in the second embodiment. In FIG. 13, a step in which the same process as in FIG. 10 is performed is given the same reference sign. Procedures of a process for clocking correction performed by the master control device 2 are the same as those in the first embodiment (FIG. 9), and thus illustration and description thereof will be omitted.

As illustrated in FIG. 10, first, the clocking device 1 reads clocking correction data from the storage circuit 90, and sets a correction cycle (step S200).

Next, in a case where a clocking data read command is received (Y in step S210), the clocking device 1 transmits the clocking data T0 to T8 to the master control device 2 (step S220).

In a case where an offset setting command is received (Y in step S230), the clocking device 1 writes the offset data designated in the offset setting command to the offset register 91 (step S240), and converts the offset data OFS held in the offset register 91 into the sign value SIGN and the offset values OFS1 and OFS0 (step S250).

Next, the clocking device 1 waits for a second update scheduled timing to come (N in step S260), and, if the second update scheduled timing comes (Y in step S260), the clocking device 1 updates count values in the counters 55 and 52 of the lower clocking unit 50 to the offset values OFS1 and OFS0 (step S270), and performs the processes in and from step S210 again.

On the other hand, in a case where the clocking data read command is not received (N in step S210), the clocking device 1 determines whether or not the correction cycle set in step S200 has elapsed on the basis of the pieces of clocking data T2 to T8 (step S232). In a case where the correction cycle has not elapsed (N in step S232), the clocking device 1 performs the processes in and from step S210 again.

In a case where the correction cycle has elapsed (Y in step S232), the clocking device 1 reads clocking correction data from the storage circuit 90, uses a correction value as offset data, and sets a correction cycle (step S234).

Next, the clocking device 1 writes the offset data (correction value) to the offset register 91 (step S240), and converts the offset data OFS held in the offset register 91 into the sign value SIGN and the offset values OFS1 and OFS0 (step S250).

Next, the clocking device 1 waits for a second update scheduled timing to come (N in step S260), and, if the second update scheduled timing comes (Y in step S260), the clocking device 1 updates count values in the counters 55 and 52 of the lower clocking unit 50 to the offset values OFS1 and OFS0 (step S270), and performs the processes in and from step S210 again.

Through the processes, correction values designated in the clocking correction data 92 are set in the clocking data T1 and T0, and clocking correction is performed, in a correction cycle designated in the clocking correction data 92.

In the clocking device 1 of the second embodiment described above, the lower clocking unit 50 of the clocking device 1 sets the offset data OFS (offset values OFS1 and OFS0) (correction values designated in the clocking correction data 92) stored in the offset register 91 in the pieces of clocking data T1 (1/100 seconds) and T0 (1/1000 seconds), so as to correct an update timing of the clocking data T2

(second), in a correction cycle designated in the clocking correction data 92. Therefore, for example, even in a situation in which clocking correction performed by receiving an offset setting command from the master control device 2 is not performed for a long period of time, clocking correction in the unit of 1/1000 seconds is periodically performed in a correction cycle included in the clocking correction data 92, and thus a clocking difference generated due to secular change or the like can be corrected.

1-3. MODIFICATION EXAMPLES

Modification Example 1

Figure 14:
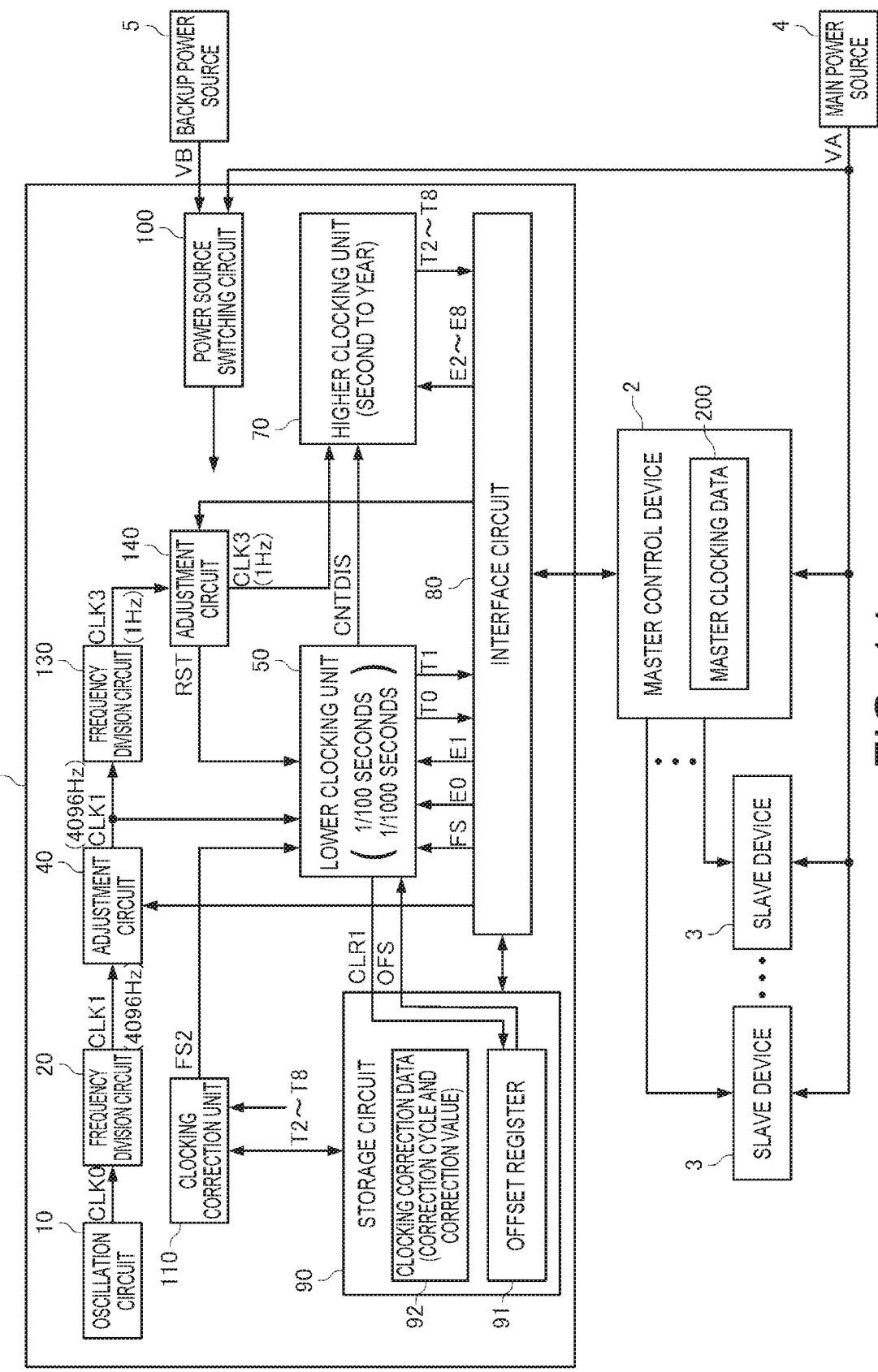
FIG. 14 is a diagram illustrating a configuration example of a clocking device according to Modification Example 1.

In the above-described respective embodiments, the clock signal CLK3 having the frequency of 1 Hz is generated by and output from the lower clocking unit 50, but may be generated as a result of a frequency division circuit frequency-dividing the clock signal CLK1 having the frequency of 4096 Hz by 4096. FIG. 14 is a diagram illustrating a configuration example of the clocking device 1 of Modification Example 1. The example illustrated in FIG. 14 is obtained by modifying the second embodiment (FIG. 11), but may be obtained by modifying the first embodiment (FIG. 1). In FIG. 14, the same constituent element as in FIG. 11 is given the same reference numeral, and, hereinafter, a description will be made focusing on the content which is different from that of the first embodiment or the second embodiment, and a description overlapping the first embodiment or the second embodiment will be omitted.

As illustrated in FIG. 14, the clocking device 1 of Modification Example 1 includes a frequency division circuit 130 and an adjustment circuit 140 instead of the frequency division circuit 30 and the adjustment circuit 60 with respect to the clocking device 1 (FIG. 11) of the second embodiment. The frequency division circuit 130 frequency-divides the clock signal CLK1 having the frequency of 4096 Hz ($=2^{12}$ Hz) by 4096 so as to generate the clock signal CLK3 having the frequency of 1 Hz. The frequency division circuit 130 may be formed of twelve T type flip-flops corresponding to a frequency division ratio in the same manner as the frequency division circuit 20 (FIG. 3). The clock signal CLK3 is supplied to the higher clocking unit 70 via the adjustment circuit 140.

The adjustment circuit 140 delays pulses included in the clock signal CLK3 such that clocking data is not changed in a period in which the clocking data is read while the clocking data is being read from the higher clocking unit 70. In other periods, the adjustment circuit 140 outputs the clock signal CLK3 supplied from the frequency division circuit 130 without change. The adjustment circuit 140 forces the counters 55 and 52 (refer to FIG. 5) of the lower clocking unit 50 to be reset in synchronization with the clock signal CLK3 such that the pieces of clocking data T2 to T8 in the units of a second or higher, the clocking data T1 in the unit of 1/100 seconds, and the clocking data T0 in the unit of 1/1000 seconds are not in contradiction with each other when the higher clocking unit 70 updates clocking data. The adjustment circuit 140 is formed of, for example, a logical circuit including a combination circuit or a sequential circuit.

The lower clocking unit 50 is not required to output the clock signal CLK3, and thus the frequency division circuits 59a and 59b are not necessary among the constituent elements illustrated in FIG. 12.

According to the clocking device 1 of Modification Example 1, the same effects as in the above-described respective embodiments can be achieved, and, for example, since a circuit configuration for generating a plurality of count values indicating times in the units of a second or higher by generating the clock signal CLK3 can be maintained to be the same simple configuration as that of a model of the related art performing a clocking operation in the units of a second or higher, it is possible to increase the compatibility with the model of the related art with respect to a circuit layout or the like.

Modification Example 2

In the above-described respective embodiments, in order to easily generate the clock signal CLK3 having the frequency of 1 Hz, the oscillation circuit 10 outputs the clock signal CLK0 having the frequency of a power of 2 (32768 Hz ($=2^{12}$ Hz)). In other words, in the above-described respective embodiments, for example, the resonator 11 of which a resonance frequency is about 32768 Hz is used, and thus the counter 52 selects 40 and 41, counts the number of pulses of the clock signal CLK1 having the frequency of 4096 Hz, and creates the clocking data T0 in the unit of 1/1000 seconds in a pseudo manner. In contrast, the clocking device 1 of Modification Example 2 creates the clocking data T0 in the accurate unit of 1/1000 seconds by using the resonator 11 having the frequency of a power of 2×1 kHz as a resonance frequency. For example, the oscillation circuit 10 outputs the clock signal CLK0 having the frequency of 32000 Hz by using the resonator 11 of which a resonance frequency is about 32000 Hz, and the frequency division circuit 20 frequency-divides the clock signal CLK0 by 32 so as to generate the clock signal CLK1 having the frequency of 1 kHz, and supplies the clock signal CLK1 to the lower clocking unit 50. Although not illustrated, in the lower clocking unit 50, the counter 52 is replaced with a 4-bit decimal BCD counter in the configuration illustrated in FIG. 5, the counter 52 counts pulses of the clock signal CLK1 so as to generate the clocking data T0 (1/1000 seconds), and the count control circuit 51 makes the count enable signal CNTEN active (for example, a high level) when carry occurs in the counter 52. The counter 55 which is an 8-bit decimal BCD counter performs a count operation in synchronization with the clock signal CLK1 so as to generate the clocking data T1 (1/100 seconds) when the count enable signal CNTEN is active. The higher clocking unit 70 may generate the clocking data T2 to T8 on the basis of the clock signal CLK1, specifically, on the basis of a carry signal (a signal with a second cycle) from the counter 55 of the lower clocking unit 50. The control flag register 54 and the frequency division circuits 59a and 59b in the configuration illustrated in FIG. 5 are not necessary.

In the same manner as in the above-described respective embodiments, also in the clocking device 1 of Modification Example 2, the offset data OFS (offset values OFS1 and OFS0) is set in the pieces of clocking data T1 (1/100 seconds) and T0 (1/1000 seconds) at an update scheduled timing of the clocking data T2 (second), an update timing of the clocking data T2 (second) is corrected, and thus it is possible to perform accurate clocking correction more simply than in the related art.

2. Electronic Apparatus

Figure 15:
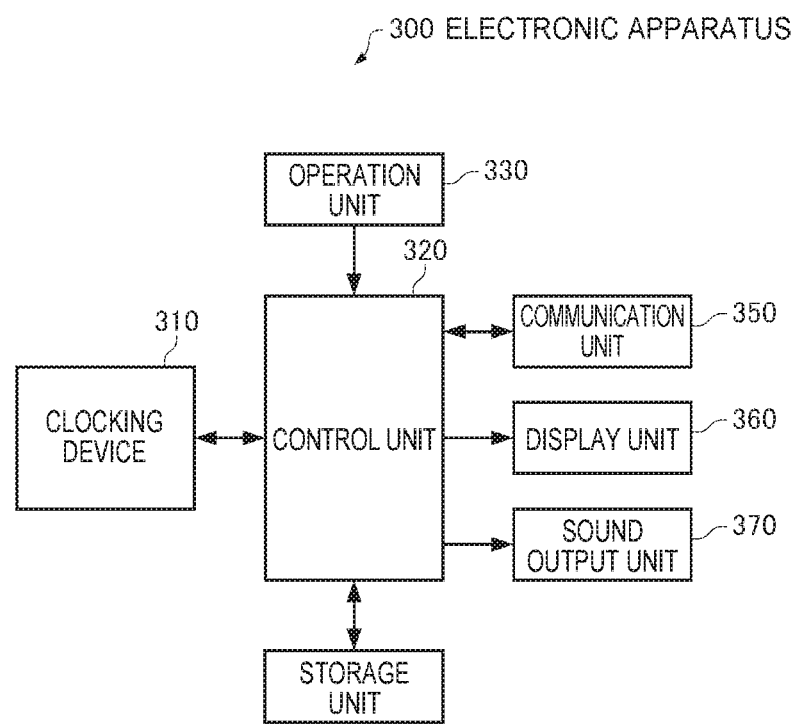
FIG. 15 is a functional block diagram illustrating an example of a configuration of an electronic apparatus of the present embodiment.
Figure 16:
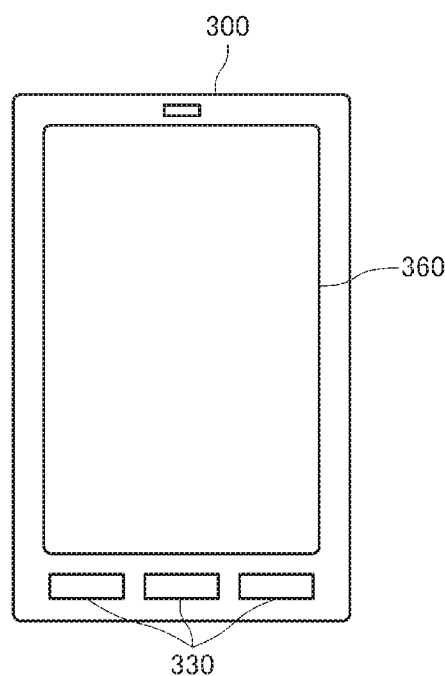
FIG. 16 is a diagram illustrating an example of an exterior of the electronic apparatus of the present embodiment.

FIG. 15 is a functional block diagram illustrating an example of a configuration of an electronic apparatus of the present embodiment. FIG. 16 is a diagram illustrating an example of an exterior of a smart phone which is an example of an electronic apparatus of the present embodiment.

An electronic apparatus 300 of the present embodiment is configured to include a clocking device 310, a control unit 320, an operation unit 330, a storage unit 340, a communication unit 350, a display unit 360, and a sound output unit 370. The electronic apparatus 300 of the present embodiment may have a configuration in which some of the constituent elements (respective units) in FIG. 15 are omitted or changed, or other constituent elements are added thereto.

The clocking device 310 performs a clocking operation, and outputs clocking data according to a command from the control unit 320.

The control unit 320 performs various computation processes or control processes according to a program stored in the storage unit 340 or the like. Specifically, the control unit 320 performs various processes corresponding to operation signals from the operation unit 330, a process of controlling the communication unit 350 in order to perform data communication with other apparatuses, a process of transmitting display signals for displaying various pieces of information on the display unit 360, a process of transmitting sound signals for outputting various sounds from the sound output unit 370, and the like. The control unit 320 reads (receives) clocking data from the clocking device 310 so as to perform various computation processes or control processes, and transmits offset data, for example, in the unit of $^{1}/_{1000}$ seconds as a correction value of the clocking data. The control unit 320 is realized by, for example, a micro controller unit (MCU) or a micro processor unit (MPU).

The operation unit 330 is an input device formed of operation keys, button switches, and the like, and outputs an operation signal corresponding to a user's operation to the control unit 320. The control unit 320 may set time information in the clocking device 310, for example, in response to a signal which is input from the operation unit 330.

The storage unit 340 stores programs or data used for the control unit 320 to perform various computation processes or control processes. The storage unit 340 is used as a work area of the control unit 320, and temporarily stores a program or data read from the storage unit 340, data which is input from the operation unit 330, results of calculation executed by the control unit 320 according to various programs, and the like. The storage unit 340 is configured to include a read only memory (ROM) or a random access memory (RAM), and is realized by, for example, a hard disk, a flexible disk, an MO, an MT, various memories, a CD-ROM, or a DVD-ROM.

The communication unit 350 performs various controls for establishing data communication between the control unit 320 and external devices.

The display unit 360 is a display device formed of a liquid crystal display (LCD) or the like, and displays various pieces of information on the basis of display signals which are input from the control unit 320. The display unit 360 may be provided with a touch panel functioning as the operation unit 330.

The sound output unit 370 is formed of a speaker or the like, and outputs various pieces of information as sounds or voices on the basis of sound signals which are input from the control unit 320.

For example, the clocking device 1 of each of the embodiments is used as the clocking device 310, and, thus, for example, it is possible to realize an electronic apparatus of which high reliability is maintained for a long period of time. The control unit 320, or the control unit 320 and the storage unit 340 correspond to the master control device 2 of each of the embodiments, and the display unit 360, the sound output unit 370, or an external device which performs communication with the control unit 320 via the communication unit 350 corresponds to the slave device 3.

There may be various electronic apparatuses as the electronic apparatus 300. The various electronic apparatuses may be, for example, an electronic timepiece, a personal computer (for example, a mobile type personal computer, a laptop type personal computer, or a tablet type personal computer), a mobile terminal such as a smart phone or a mobile phone, a digital camera, an ink jet type ejection apparatus (for example, an ink jet printer), a storage area network apparatus such as a server (time server), a router, or a switch, a local area network apparatus, a mobile terminal base station apparatus, a television, a video camera, a video recorder, a car navigation apparatus, a real time clocking apparatus, a pager, an electronic organizer (including a communication function), an electronic dictionary, an electronic calculator, an electronic gaming machine, a gaming controller, a wordprocessor, a workstation, a videophone, a security television monitor, an electronic binocular, a POS terminal, a medical apparatus (for example, an electronic thermometer, a sphygmomanometer, a blood glucose monitoring system, an electrocardiographic apparatus, an ultrasonic diagnostic apparatus, or an electronic endoscope), a fish-finder, various measurement apparatuses such as a gas meter, a water meter, and a watthour meter (smart meter) which have a wired or wireless communication function and can transmit various pieces of data, meters and gauges (for example, meters and gauges of vehicles, aircrafts, and ships), a flight simulator, a head mounted display, a motion tracer, a motion tracker, a motion controller, and a pedestrian dead reckoning (PDR) apparatus.

3. Vehicle

Figure 17:
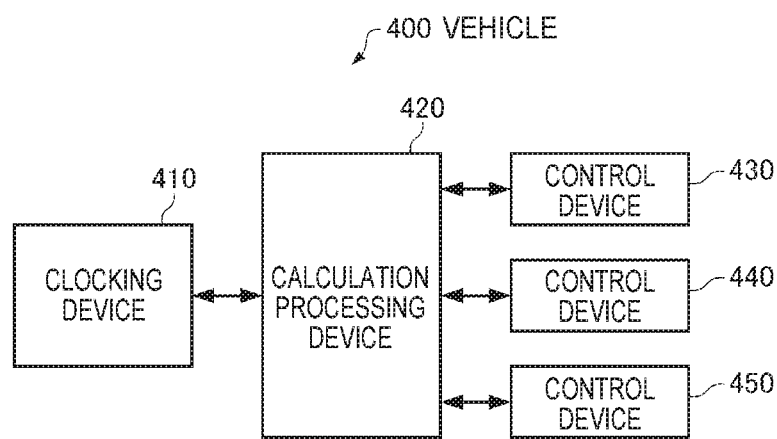
FIG. 17 is a functional block diagram illustrating an example of a configuration of a vehicle of the present embodiment.
Figure 18:
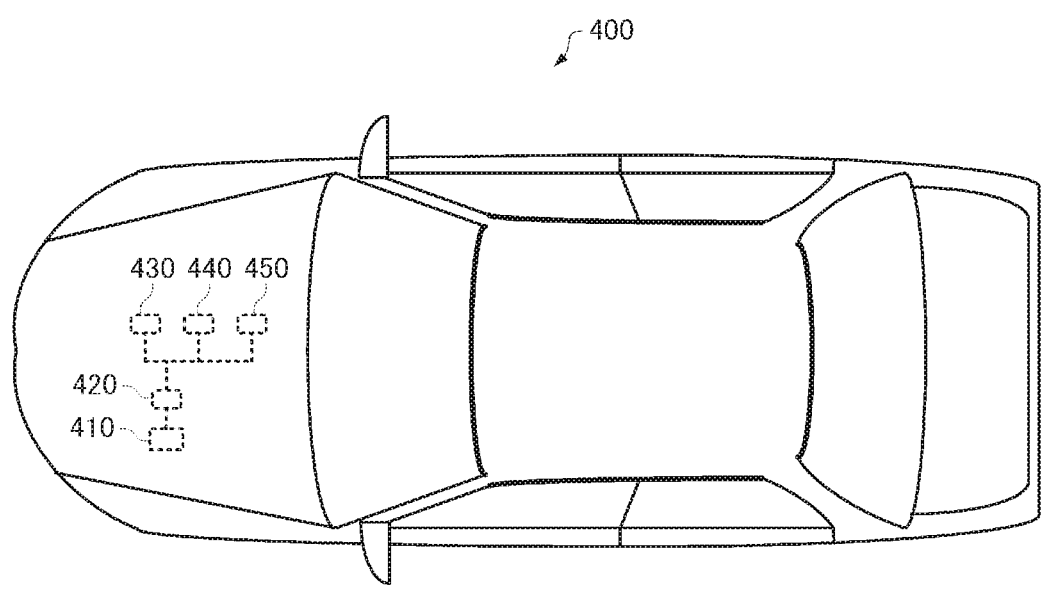
FIG. 18 is a diagram illustrating an example of an exterior of the vehicle of the present embodiment.

FIG. 17 is a functional block diagram illustrating an example of a configuration of a vehicle of the present embodiment. FIG. 18 is a diagram (top view) illustrating an example of an exterior of an automobile which is an example of the vehicle of the present embodiment. A vehicle 400 of the present embodiment is configured to include a clocking device 410, a calculation processing device 420, and control devices 430, 440 and 450. The vehicle of the present embodiment may have a configuration in which some of the constituent elements (respective units) in FIGS. 17 and 18 are omitted or other constituent elements are added thereto.

The clocking device 410 performs a clocking operation, and outputs clocking data according to a command from the calculation processing device 420.

The calculation processing device 420 performs various computation processes or control processes according to a program stored in a built-in storage unit (not illustrated). Specifically, the calculation processing device 420 performs a process of controlling the control devices 430, 440 and 450. The calculation processing device 420 reads (receives) clocking data from the clocking device 410 so as to perform various computation processes, and transmits offset data, for example, in the unit of $^{1}/_{1000}$ seconds as a correction value of the clocking data.

The control devices 430, 440 and 450 perform various controls on, for example, an engine system, a brake system, a remote handset system, and the like in the vehicle 400.

For example, the clocking device 1 of each of the embodiments is used as the clocking device 410, and, thus, for example, it is possible to realize a vehicle of which high reliability is maintained for a long period of time. The calculation processing device 420 corresponds to the master control device 2 of each of the embodiments, and the control devices 430, 440 and 450 correspond to the slave devices 3.

There may be various vehicles as the vehicle 400. The various vehicles may be, for example, an automobile (including an electric car), an aircraft such as a jet plane or a helicopter, a ship, a rocket, and an artificial satellite.

The invention is not limited to the present embodiment and may be variously modified within the scope without departing from the spirit of the invention.

The above-described embodiments and modification examples are only examples, and the invention is not limited thereto. For example, the embodiments and the modification examples may be combined with each other as appropriate.

The invention includes substantially the same configuration (for example, a configuration in which functions, methods, and results are the same, or a configuration in which objects and effects are the same) as the configuration described in the embodiments. The invention includes a configuration in which an inessential part of the configuration described in the embodiments is replaced with another part. The invention includes a configuration which achieves the same advantageous effect or a configuration capable of achieving the same object as in the configuration described in the embodiments. The invention includes a configuration in which a well-known technique is added to the configuration described in the embodiments.

The entire disclosures of Japanese Patent Application Nos. 2017-112383, filed Jun. 7, 2017 and 2017-228243, filed Nov. 28, 2017 are expressly incorporated by reference herein.

What is claimed is:

1. A clocking device comprising:
   a first clocking circuit that generates first clocking data in synchronization with a clock signal;
   a second clocking circuit that generates second clocking data which is updated in a cycle longer than a cycle in which the first clocking data is updated;
   an interface circuit that transmits the first clocking data to an external device, and receives a first correction value from the external device;
   a storage circuit that stores the first correction value,
   wherein the first clocking circuit sets the first correction value in the first clocking data so as to correct an update timing of the second clocking data; and
   wherein, in a case where the first clocking data is a predetermined value, the first clocking circuit sets the first correction value in the first clocking data so as to correct the update timing.

2. The clocking device according to claim 1,
   wherein the first correction value is a value which is generated by the external device based on the first clocking data and clocking data included in the external device.

3. The clocking device according to claim 1,
   wherein the first clocking circuit updates the first clocking data in the unit of $1/1000$ seconds, and
   wherein the second clocking circuit updates the second clocking data in the unit of one second.

4. The clocking device according to claim 3,
   wherein a frequency of the clock signal is 4096 Hz, and
   wherein the first clocking circuit has a counter which selects 40 and 41 at a ratio of 4 to 96 and counts the number of pulses of the clock signal in 6 bits, and outputs a higher 4-bit count value of a 6-bit count value output from the counter as part of the first clocking data.

5. The clocking device according to claim 1,
   wherein the storage circuit further stores a second correction value and a correction cycle, and
   wherein the first clocking circuit sets the second correction value in the first clocking data so as to correct the update timing in the correction cycle.

6. An electronic apparatus comprising:
   the clocking device according to claim 1; and
   a control device that transmits the first correction value to the clocking device, as the external device.

7. A vehicle comprising the clocking device according to claim 1.

* * * * *